United States Patent
Schalk et al.

(10) Patent No.: US 11,465,342 B2
(45) Date of Patent: Oct. 11, 2022

(54) THREE-DIMENSIONAL PRINTER

(71) Applicant: HEWLETT-PACKARD DEVELOPMENT COMPANY, L.P., Houston, TX (US)

(72) Inventors: Wesley R. Schalk, Vancouver, WA (US); Kris M. English, Vancouver, WA (US); Justin M. Roman, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 727 days.

(21) Appl. No.: 16/077,091

(22) PCT Filed: Jul. 28, 2017

(86) PCT No.: PCT/US2017/044325
§ 371 (c)(1),
(2) Date: Aug. 10, 2018

(87) PCT Pub. No.: WO2019/022757
PCT Pub. Date: Jan. 31, 2019

(65) Prior Publication Data
US 2021/0178668 A1 Jun. 17, 2021

(51) Int. Cl.
*B29C 64/165* (2017.01)
*B29C 64/259* (2017.01)
(Continued)

(52) U.S. Cl.
CPC .......... *B29C 64/165* (2017.08); *B29C 64/209* (2017.08); *B29C 64/245* (2017.08);
(Continued)

(58) Field of Classification Search
CPC .... B22F 10/12–18; B22F 10/14; B22F 10/20; B22F 10/22–28; B22F 10/28;
(Continued)

(56) References Cited

U.S. PATENT DOCUMENTS 7,464,733 B2   12/2008   Cox
7,867,302 B2    1/2011   Nevoret et al.
(Continued)

FOREIGN PATENT DOCUMENTS

CN   104722759 A   6/2015
CN   105397088 A   3/2016
(Continued)

OTHER PUBLICATIONS

"How to Settings HP Multi Jet Fusion Materials", 3D Printer Manual, retrieved from Internet : http://www.3dprintermanual.com/2017/02/how-to-settings-hp-multi-jet-fusion.html, 2017, 8 pages.

*Primary Examiner* — Manley L Cummins, IV
(74) *Attorney, Agent, or Firm* — HP Inc. Patent Development

(57) ABSTRACT

A three-dimensional (3D) printer and method including a material cartridge receiver to hold a removable material cartridge to accept build material from the 3D printer and to make build material available from the material cartridge to the 3D printer for printing of the 3D object. A liquid cartridge receiver holds a removable liquid cartridge to make available print liquid from the liquid cartridge for a print assembly.

12 Claims, 12 Drawing Sheets

(51) Int. Cl.
*B29C 64/357* (2017.01)
*B29C 64/245* (2017.01)
*B29C 64/209* (2017.01)
*B29C 64/268* (2017.01)
*B29C 64/336* (2017.01)
*B33Y 10/00* (2015.01)
*B33Y 30/00* (2015.01)
*B33Y 40/00* (2020.01)

(52) U.S. Cl.
CPC .......... *B29C 64/259* (2017.08); *B29C 64/268* (2017.08); *B29C 64/336* (2017.08); *B29C 64/357* (2017.08); *B33Y 10/00* (2014.12); *B33Y 30/00* (2014.12); *B33Y 40/00* (2014.12)

(58) Field of Classification Search
CPC ......... B22F 10/70–73; B22F 12/50–58; B29C 64/153; B29C 64/165; B29C 64/264–291; B29C 64/307–336; B29C 64/357
See application file for complete search history.

(56) References Cited

U.S. PATENT DOCUMENTS

| | | | |
|---|---|---|---|
| 7,887,316 B2 * | 2/2011 | Cox | B29C 64/153 |
| | | | 425/375 |
| 8,185,229 B2 | 5/2012 | Davidson | |
| 9,126,167 B2 | 9/2015 | Ljungblad | |
| 10,569,331 B2 * | 2/2020 | Kawada | B29C 64/307 |
| 2001/0045678 A1 | 11/2001 | Kubo et al. | |
| 2002/0062909 A1 * | 5/2002 | Jang | B33Y 30/00 |
| | | | 156/155 |
| 2002/0079601 A1 * | 6/2002 | Russell | B29C 64/165 |
| | | | 264/40.1 |
| 2002/0093115 A1 * | 7/2002 | Jang | B33Y 10/00 |
| | | | 264/113 |
| 2004/0012112 A1 * | 1/2004 | Davidson | B33Y 10/00 |
| | | | 264/109 |
| 2004/0084814 A1 * | 5/2004 | Boyd | B33Y 40/00 |
| | | | 264/109 |
| 2007/0257055 A1 | 11/2007 | Scott et al. | |
| 2008/0006334 A1 * | 1/2008 | Davidson | B33Y 30/00 |
| | | | 222/630 |
| 2011/0217544 A1 | 9/2011 | Young et al. | |
| 2015/0079214 A1 | 3/2015 | Shi et al. | |
| 2015/0298394 A1 | 10/2015 | Sheinman | |
| 2015/0298397 A1 | 10/2015 | Chen et al. | |
| 2016/0271887 A1 * | 9/2016 | Shi | B29C 64/35 |
| 2016/0339639 A1 * | 11/2016 | Chivel | B23K 26/142 |
| 2017/0028622 A1 | 2/2017 | Westlind et al. | |
| 2019/0001413 A1 * | 1/2019 | Golz | B22F 10/20 |

FOREIGN PATENT DOCUMENTS

| | | |
|---|---|---|
| DE | 20107262 U1 | 8/2001 |
| EP | 2450177 A1 | 5/2012 |
| JP | 2001334583 A | 12/2001 |
| JP | 2004058248 A | 2/2004 |
| JP | 2006248231 A | 9/2006 |
| JP | 2007296854 A | 11/2007 |
| JP | 2009538226 A | 11/2009 |
| JP | 2015205485 A | 11/2015 |
| JP | 2015205512 A | 11/2015 |
| JP | 2016522312 A | 7/2016 |
| WO | 2014039378 A1 | 3/2014 |
| WO | WO-2014144630 A1 * | 9/2014 .......... B23K 26/034 |
| WO | WO-2015141782 A1 | 9/2015 |

\* cited by examiner

200

300

THREE-DIMENSIONAL PRINTER

BACKGROUND

Three-dimensional (3D) printing may produce a 3D object. In particular, a 3D printer may add successive layers of build material, such as powder, to a build platform. The 3D printer may selectively solidify portions of each layer under computer control to produce the 3D object. The material may be powder, or powder-like material, including metal, plastic, composite material, and other powders. The objects formed can be various shapes and geometries, and produced via a model such as a 3D model or other electronic data source. The fabrication may involve laser melting, laser sintering, electron beam melting, thermal fusion, heat sintering, and so on. The model and automated control may facilitate the layered manufacturing and additive fabrication. The 3D printed objects may be intermediate or end-use products, as well as prototypes. Product applications may include aerospace parts, machine parts, medical devices (e.g., implants), automobile parts, fashion products, structural and conductive metals, ceramics, and other applications.

DESCRIPTION OF THE DRAWINGS

Certain examples are described in the following detailed description and in reference to the drawings, in which.

DETAILED DESCRIPTION

Figure 1:
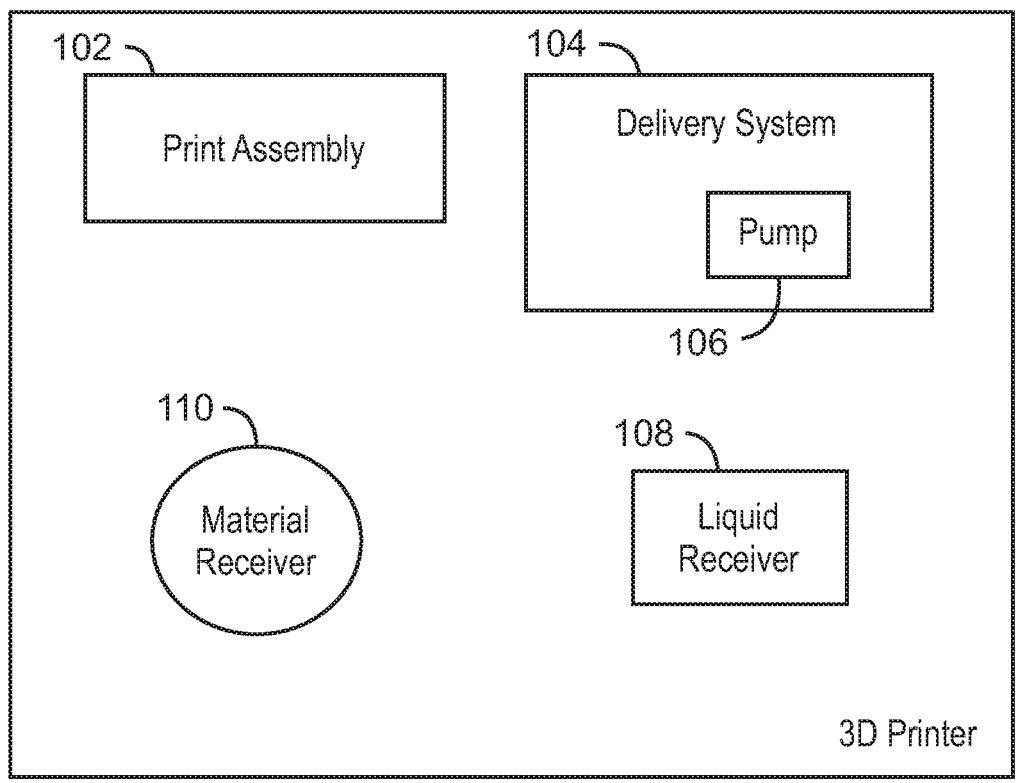
FIG. 1 is a block diagram of a 3D printer in accordance with examples of the present techniques.

Three dimensional printers may form 3D objects from build material such as powder. The cost of a 3D printer producing 3D objects may be related to the cost of the build material. Thus, there may be a desire for 3D printers to utilize recycle material as build material. Yet, for some applications, there may be benefit in utilizing new material because of reasons such as product purity, strength, and finish in certain instances.

To mix recycle material and new material as build material for some 3D printers, a user may employ extra floor space and equipment external to the 3D printer. A user may also rely on peripheral resources in the extraction of printed 3D objects from a 3D printer. Increased costs may result from dedicated resources external to the printer for mixing of build material and for extraction. Further, manual handling of build material in mixing, addition, and extraction may result in cross-contamination of build material with the environment. Some 3D printers do not store the build material in material cartridges.

Certain examples of the present techniques provide a 3D printer having internal or integrated handling of the build material, and which may employ material cartridges to contain build material. Therefore, manual handling of build material and associated cross-contamination of the build material with the environment may be reduced. Indeed, examples herein may include 3D printers that provide contained handling to mix recycle material and new material as the build material. Example 3D printers herein may also provide for contained handling in the recovery of excess or unfused build material in the extraction of the printed 3D object, and so on. The printer integrated conveying systems may include, for instance, a closed-loop or substantially closed-loop material handling system for transporting material internally within the 3D printer. Certain examples of the 3D printers may generally not employ external dedicated resources, extensive floor space separate from the printer, or external equipment to mix powder or extract 3D objects from unfused powder.

Examples herein provide for build material stored in material cartridges for addition of build material to the printer. A material cartridge may be a housing or canister to contain build material. A material cartridge receiver of the 3D printer may hold the material cartridge. The 3D printer may form the 3D object from the material. The material may be made from one or more of metal, plastic, polymer, glass, ceramic, or other material.

Furthermore, in some examples, recycle material within a 3D printer may be loaded into material cartridges held internally in the printer. Indeed, the material cartridge in the cartridge receiver may receive build material from the 3D printer, as well as make material available to the 3D printer for printing of the 3D object. The cartridges filed with the recovered material or recycle material may be removed from the printer and stored for future use. Thus, some examples may provide for both contained addition and contained removal of build material. For particular examples, recycle material may remain substantially free of external contaminants. Closed-loop material handling may reduce the risk of unknown material entering the 3D printer, and so forth.

A present example includes a 3D printer having an integrated cartridge receiver to hold a removable material cartridge to make available build material from the material cartridge and to accept build material into the material cartridge from the 3D printer. The 3D printer may also include an internal storage vessel to receive build material from the material cartridge held by the material cartridge receiver. Further, an internal conveying system, such as a pneumatic conveyance system, integrated within the 3D printer may transport build material from the storage vessel for the 3D printing.

The 3D printer material-cartridge receiver that holds a removable material cartridge may be a slot, receptacle, cavity, sleeve, and the like. As mentioned, the 3D printer may supply material from the material cartridge as build material for printing. The 3D printer may also receive material into the material cartridge, such as excess build material from the 3D printing. The 3D printer may include more than one material cartridge receiver. For instance, the aforementioned material cartridge receiver may be a recycle material cartridge receiver. The 3D printer may further include a new material cartridge receiver that makes new material available as build material for printing. For the 3D printing, one or more conveying systems of the 3D printer may facilitate transport of build material including new material and recycle material to, for example, a powder spreader, build enclosure, or build platform.

In a 3D printer having two cartridge receivers, one cartridge receiver may receive a first material cartridge containing new material. The other cartridge receiver may receive a second material cartridge containing recycle material or may receive an empty cartridge to collect build material from the 3D printer. The recycle material may be excess material from a build enclosure not fused during the generation of the 3D object. In some examples, the printer may include a build-material reclaim system to separate unfused build material from fused build-material after the generation of a 3D object. Recycle material may be referred to as reclaimed or reclaim material, recycled material, excess material, unfused material, and so forth.

Recycle material cartridges may be removed and stored for future use or discarded. Moreover, once a new material cartridge (fresh material cartridge) has been emptied by the 3D printer, the empty new material cartridge may be inserted into the second cartridge receiver to receive unfused or recycle material. In addition, the 3D printer may include multiple internal vessels to store new material (fresh material) received from the new material cartridge or store recycle material received from either the recycle material cartridge or the build enclosure. In one implementation, a new material cartridge (e.g., fresh powder container) is emptied into an internal vessel or hopper, and fresh or new material used by the printer is taken from this internal vessel as build material for the printer to form the 3D object. However, in another implementation, there is no internal vessel or hopper, and fresh or new material is taken directly from the new material cartridge for the printer to form the 3D object.

The material cartridge may be operationally removable from the material cartridge receiver (e.g., slot). As indicated, a slot with a material cartridge therein may provide material to the 3D printer and also recover material from the 3D printer. In particular examples, the 3D printer may have two slots, one for "new" material and a second for "recycle" material. Other examples may have more than two slots for material cartridges, or a single slot for a material cartridge. The new or fresh material slot may hold a material cartridge that makes available new material as build material for the build enclosure for printing of the 3D object. In contrast, the recycle material slot may hold a material cartridge that receives material from the 3D printer such as from the build enclosure. The material entering the material cartridge in the recycle material slot may be surplus material left over from the printing of the 3D object. The recycle material slot may also hold the material cartridge to make available recycle material as build material for the build enclosure for printing of the 3D object.

Full or partially-filled recycle material cartridges may supply recycle material for the build enclosure, or be removed for future use, and the like. In other words, some of these cartridges filled with recycle material may remain in place in the printer slot, or be removed and stored or discarded. Some of these recycle cartridges filled with recycle material may be removed and kept for future use when the 3D printer is short of recycle material to be mixed with new material and utilized or consumed during printing. In certain examples of a 3D printer with a single slot for a material cartridge, a new material cartridge may be inserted into the slot and have the contents thereof emptied into an internal storage vessel of the printer. The cartridge could then become a recipient for recycle material.

In one implementation, a material input to the printer is new material. A material input may also possibly or intermittently include external recycle material, though recycle material may be more commonly removed from the printer rather than added as an external input to the printer. Again, recycle material may be produced as a result of printing operations and stored internally. The amount of recycle material produced may exceed internal storage capacity and be removed from the printer. Indeed, a purpose of the recycle material cartridge and associated slot in the 3D printer may be to receive excess material from the build enclosure and, therefore, facilitate offloading of excess material from the printer. In other words, a recycle cartridge in the single slot or the second slot of the 3D printer may receive excess material from the build enclosure after printing. The excess material may be build material from the build enclosure that did not become fused into the 3D object, and may be classified as recycle material.

The 3D printing may be via a thermal fusion system and a build platform. A printer conveying system may transport the material for printing. The 3D printer may include a build-material applicator, such as a powder spreader or powder spreader arm, to distribute the build material layer-by-layer across the build platform. The build-material applicator may include additional components to facilitate receipt and discharge or distribution of powder to the build enclosure and build platform.

The thermal fusion system may be a thermal processing unit or module to fuse build material on the build platform to form the 3D object. At least a portion of the thermal fusion system of the printer may be above the build enclosure having the build platform. The thermal fusion system may include a print assembly, such as a printbar, to eject print liquid, such as a fusing agent and other agents, onto the build material on the build platform. The print assembly may eject print liquid onto the build material on the build platform to generate the 3D object from the build material on the build platform. The printbar may have nozzles to eject the print liquid. The printbar may eject the print liquid to specific points or areas of the build material surface under the control of a 3D model to form the 3D object layer-by-layer. In some examples, the print assembly may eject the print liquid onto selected portions of successive layers of build material under computer control for an energy source to solidify or fuse those portions of build material to form the 3D object layer-by-layer. The computer control may be per a 3D model of the object being formed.

The thermal fusion system may include an energy source to apply energy, such as heat or light, to the build material and thus to the print liquid ejected onto the build material to facilitate fusion of the build material (e.g., powder) at the points or areas where the print liquid is applied to the build material. In certain examples, the energy source may apply energy substantially uniformly across the build material on the build platform. In some examples, the print liquid as a fusing agent may increase absorption of energy by the build material where the print liquid is applied. The thermal fusion system may also include one or more movement devices, such as a carriage(s), to hold, move, and position the printbar or energy source over the build material on the build platform.

Thus, examples herein provide for a 3D-printer handling of build material powder, as well as 3D-printer thermal fusion of the build material via print liquid and energy to form a 3D object. As discussed, the build material may include new or fresh material, as well as recycle material recovered from the printer. The 3D printer may include a build enclosure and an associated build platform on which the 3D printer forms a 3D object from the build material. As discussed below, the printer may incrementally lower the build platform as each layer of the 3D object is printed or formed. Furthermore, examples of the present techniques provide a 3D printer having internal delivery of print liquid such as printing agents including fusing agents, detailing agents, coloring agents, and so forth.

Indeed, the 3D printer may include a liquid delivery system to make available the print liquid. The 3D printer may have a liquid cartridge receiver to hold a removable liquid cartridge to make available print liquid from the liquid cartridge for the liquid delivery system and the print assembly. In some examples, the delivery system includes a pump to provide print liquid to the print assembly.

FIG. 1 is 3D printer 100 having a print assembly 102 to eject print liquid onto build material to form a 3D object. For each successive layer of build material, the print assembly 102 may eject the print liquid onto selected portions of the build material. In an example, the 3D printer 100 forms a 3D object layer-by-layer via thermal fusion of the build material.

The print assembly 102 may include a printbar or printheads, or other type of print assembly. The print assembly may be a printbar having print nozzles to eject the print liquid. The nozzles may be disposed on dies or printheads, or on other substructures, of the printbar.

The 3D printer 100 includes a liquid delivery system 104 to provide print liquid to the print assembly 102. Again, the print liquid may include printing agents or other compounds. In certain examples, the liquid delivery system 104 may include at least one pump 106 to provide a motive force for supply of the print liquid to the print assembly 102. In other examples, a pump 106 is not employed but instead gravity or other motive force is employed to deliver print liquid to the print assembly 102.

The 3D printer 100 includes at least one liquid cartridge receiver 108 to receive and hold an operationally-removable print-liquid cartridge. The liquid cartridge receiver 108 may be a slot, receptacle, or cavity to receive and secure the print liquid cartridge. The print liquid cartridge may be a container that stores print liquid and is inserted by a user into the liquid cartridge receiver 108. In operation, the liquid delivery system 104 may receive print liquid from the print liquid cartridge held by the liquid cartridge receiver 108.

Lastly, the 3D printer 100 may also have at least one material cartridge receiver 110 to receive and hold an operationally-removable material cartridge. In some examples, the material cartridge may be sealed or substantially sealed to prevent or reduce build material from leaking or escaping to the environment when the material cartridge is removed from the printer. Such may facilitate a clean and convenient handling of material. The material cartridge receiver 110 may be a slot, receptacle, or cavity to receive and secure the material cartridge. The material cartridge may be a container that stores build material (e.g., powder) and is inserted by a user into the material cartridge receiver 110. The material cartridge receiver 110 may make material available from the material cartridge as build material, such as for 3D printing including for a build platform in the 3D printer. In certain examples, the material cartridge receiver 110 may accept excess build material from the 3D printing into the material cartridge.

In summary, the 3D printer 100 includes a material cartridge receiver 110 to hold a removable material cartridge to accept build material, such as powder, into the material cartridge from the 3D printer 100 and to make available build material from the material cartridge. The printer 100 includes a print assembly 102 to eject print liquid onto selected portions of the build material on a build platform of the 3D printer 100 to form a 3D object layer-by-layer from the build material. The printer 100 includes a liquid cartridge receiver 108 to hold a removable liquid cartridge to make available print liquid from the liquid cartridge for the print assembly 102. The printer 100 incudes a delivery system 104 employing at least a pump 106 or gravity to provide print liquid to the print assembly 102.

Figure 2:
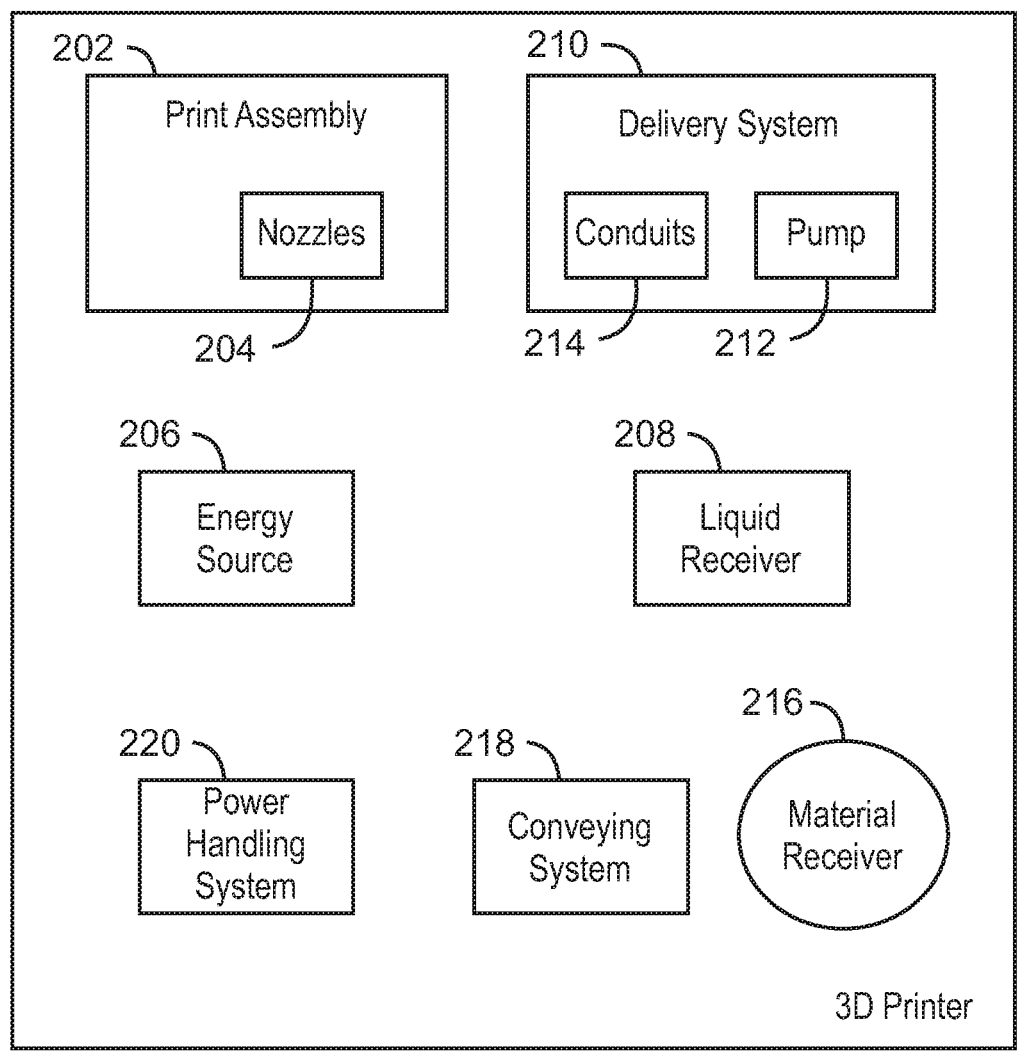
FIG. 2 is a block diagram of a 3D printer in accordance with examples of the present techniques.

FIG. 2 is a 3D printer 200 having a print assembly 202 with nozzles 204 to eject print liquid onto build material on a build platform to generate a 3D object from the build material. The print assembly 202 may apply print liquid to selected portions of layers of build material applied to the build platform to form associated layers of the 3D object. The print assembly 202 may eject print liquid onto selected portions of successive applications or layers of build material on the build platform to form successive layers of the 3D object. In operation, the 3D printer 200 may lower the build platform incrementally as each layer of the 3D object is formed.

The print liquid may include fusing agent, detailing agent, coloring agent, ink, colorant, pigment, carrier, dye, thermoplastic, and so on. The print assembly 202 may include a printbar or other type of print assembly. The print assembly may be a printbar having the print nozzles 204 to eject the print liquid. The nozzles 204 may reside on, or be a component of, substructures of the printbar. The substructures may be, for example, dies, pins, printheads, or other substructures.

The number of print nozzles 204 on the print assembly 202 or printbar can be up to hundreds or thousands, or more. In one example, the number of nozzles is less than 500 nozzles. In another example, the number of print nozzles 204 is in a range from 10,000 nozzles to 70,000 nozzles. In yet another example, the print assembly 202 is a printbar having at least 30,000 print nozzles 204.

The diameter of each nozzle 204 can be as small as 70 microns or less. The diameter can be 5 microns, 10 microns, 15 microns, 30 microns, or 50 microns, or any values therebetween. In one example, the nozzle diameter is in a range of 5 microns to 30 microns. The diameter of each nozzle 204 can be greater than 70 microns.

The ejection of the print liquid through the nozzles 204 may be via pressure differential, a pump, thermal or heat, heating elements, thermal bubble or bubble jet, piezoelectric, and so on. If heating elements are employed, the heating elements may be resistors in some examples. The piezoelectric technique may include piezo crystals with the application of voltage or current.

As mentioned, the print assembly 202 may eject print liquid onto successive layers of build material distributed across the build platform. The print assembly 202 may eject the print liquid onto selected portions of each layer of the build material under computer control to generate respective layers of the 3D object being formed. The computer control may be per a model, e.g., 3D model, of the 3D object to be generated.

The 3D printer 200 includes an energy source 206 to apply energy to the build material on the build platform to form the 3D object from the build material. The presence of the print liquid ejected onto the selected portions of the build material may increase energy transfer into those portions of the build material such that those portions of build material are selectively solidified or fused. The energy source 206 may include a light source, infrared light source, near-infrared light source, radiation source, heat source, heat lamps, and so on. The energy source 206 in conjunction with the print assembly 202 may print the 3D object layer-by-layer from build material on the build platform.

The 3D printer 200 includes at least one liquid cartridge receiver 208 to receive and hold an operationally-removable print-liquid cartridge. As discussed with respect to the preceding figure, a liquid cartridge receiver 208 may be a slot, receptacle, or cavity to receive and secure the print liquid cartridge. As indicated, the print liquid may be printing agents such as fusing agents to promote thermal fusion, detailing agents (e.g., water, etc.) to inhibit fusion, coloring agents, and other compounds. In operation, a liquid delivery system 210 may receive print liquid from the print liquid cartridge held by the liquid cartridge receiver 208.

The 3D printer 200 includes the liquid delivery system 210 to provide print liquid to the print assembly 202. In certain examples, the liquid delivery system 210 may include at least one pump 212 and conduits 214 to supply print liquid to the print assembly 202. The one or more pumps 212 may be a positive displacement pump, centrifugal pump, axial flow pump, and so forth. Examples of a positive displacement pump include a diaphragm pump or gear pump. Other types of positive displacement pumps may be employed. Moreover, in particular examples, a pump 212 is not employed but instead the print liquid supplied via gravity or other motive force. The delivery system 210 may supply the print liquid via a pump 212 or gravity. Moreover, the conduits 214 may include tubing, piping, channels, fittings, valves, and so on. Lastly, the delivery system 210 may include a vessel(s), e.g., a reservoir(s), to receive print liquid and make available print liquid.

Furthermore, the 3D printer 200 may also have at least one material cartridge receiver 216 to receive and secure an operationally-removable material cartridge for build material. As discussed with respect to the preceding figure, a material cartridge receiver 216 may make material available from the material cartridge as build material for 3D printing, such as for a thermal fusion module or a build platform in the 3D printer. In some examples, the material cartridge receiver 216 may accept excess build material into the material cartridge from the 3D printing, such as from a build enclosure associated with the build platform or from a reclaim vessel or recycle vessel. As discussed, the material cartridge filled with the excess build material from the 3D printing may be removed from the material cartridge receiver 216 to remove build material from the 3D printer 200. Alternatively, the material cartridge filled with excess material internally recovered in the printer 200 may remain in the receiver 216 and make available the excess build material as recycle material for the 3D printing.

The 3D printer 200 may include a conveying system 218 to facilitate transport of build material from the material cartridge to the 3D printing. The conveying system 218 may be integrated with the 3D printer 200 and internal within the 3D printer 200 housing. In some examples, the conveying system 218 includes a pneumatic conveyance system. Other types of conveying systems may be employed, such as mechanical, vibration, auger feeding, and the like. If a pneumatic conveyance is employed, the pneumatic conveying may be in the dilute phase in some examples. Moreover, in certain examples, the conveying system 218 includes a dispense vessel or hopper to supply build material for the 3D printing.

In the illustrated example, the 3D printer 200 includes a powder handling system 220 to receive build material from the conveying system 218 or dispense vessel. The powder handling system 220 may include, for example, a rotary feeder and a feed dosing apparatus to provide a desired amount of build material for a build-material applicator. The build-material applicator, such as a powder spreader, may distribute the dosed build material across the build platform. Such dosing and spreading of the build material may be repeated for successive layers of build material applied to the build platform as the 3D object is formed layer-by-layer.

Figure 3:
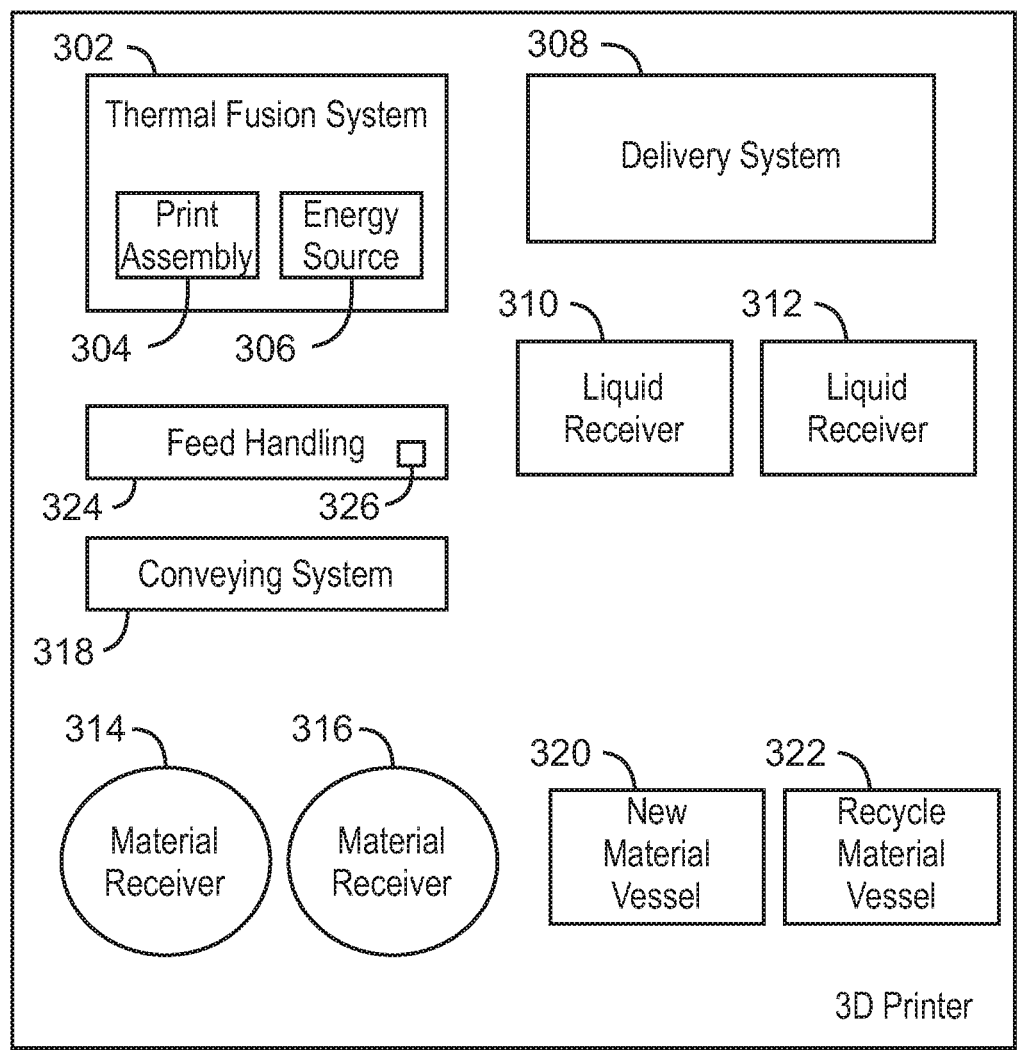
FIG. 3 is a block diagram of a 3D printer in accordance with examples of the present techniques.

FIG. 3 is a 3D printer 300 having a thermal fusion system 302 to selectively solidify or fuse portions of successive layers of a build material on a build platform to print or form a 3D object. In operation, the 3D printer 300 may place build material, e.g., powder, on the build platform to generate the 3D object. In some examples, the thermal fusion system 302 may function at least partially over the build platform to form the 3D object.

Aspects of the discussion herein may be applicable to the printers 100, 200, 300 and the printers in subsequent figures as a selective laser sintering (SLS) printer or electron beam melting (EBM) printer. In other words, the thermal fusion system 302 may be more broadly a selective solidification module that may perform SLS or EBM, or other 3D printing techniques, via applying energy, e.g., laser, electron beam, etc., to the build material on the build platform. In other examples, the printers 100, 200, 300 and the printers in subsequent figures are not a SLS printer or EBM printer. Instead, the thermal fusion system 302 performs, via applied energy and print liquid, fusion for selective solidification. Other configurations are applicable. In all, the build platform may receive build material, for example, as solid particles of powder from a conveying system internal to the printer 300. A selective solidification module which may be or include the thermal fusion module 302 may then solidify, e.g., sinter, melt, fuse, etc., the solid particles layer-by-layer into the shape of the 3D object to generate or form the 3D object.

The thermal fusion system 302 may include a print assembly 304, such as a printbar, to eject print liquid onto selected portions of the build material to facilitate formation of the 3D object. The thermal fusion system 302 includes an energy source 306 to apply energy to the build material and, thus, to the print liquid ejected onto the build material to fuse or solidify the selected portions of the build material to form the 3D object layer-by-layer. The print liquid, if employed, may increase application, absorption, transfer, or heat transfer, of the energy to the portions of the build material on which the print liquid resides. Further, the thermal fusion system 302 may include one or more movement devices, such as carriages, to position the print assembly 304 or energy source 306 over the build platform.

The thermal fusion system 302 may include the energy source 306 to apply energy to the build material on the build platform to form the 3D object on the build platform. The application of energy may selectively solidify, e.g., sinter, melt, fuse, etc., portions of successive layers of build material on the build platform to generate the 3D object. The energy source 306 may be a light source, heat source, radiation source, laser source, heat lamp, halogen lamp, electron beam source, infrared (IR) light source, near IR light source, ultraviolet (UV) light source, and so on.

For instances of the 3D printer 300 employing print liquid in the solidification of build material into the 3D object, the solidification may involve fusion, binding, curing, and so on, of the build material on the build platform. For example, the fusion may be thermal fusion with the print liquid as a fusing agent or other printing agent. For thermal fusion, the build material may be different materials including polymers, plastics, metals, ceramics, and so on. In one example with thermal fusion, the build material includes polyamide or Nylon. As for binding of build material to form the 3D object, the build material may include, for example, gypsum powder, calcium sulfate dihydrate, or similar materials. The print liquid may include, for instance, a printing agent to bind the gypsum powder or similar powder to generate the 3D object on the build platform. Examples of curing as the solidification may include, for example, UV curing of selected portions of each layer of the build material applied to the build platform.

The 3D printer 300 has a liquid delivery system 308 to provide print liquid to the print assembly 304. Further, the printer 300 has multiple liquid-cartridge receivers 312 to each receive and hold a print liquid cartridge. The receivers 312 may be slots, cavities, or receptacles to secure the print liquid cartridges. The delivery system 308 may supply print liquid from print liquid cartridges in the liquid cartridge receivers 312 to the print assembly 304. Moreover, as discussed below, print liquid reservoirs may be associated with the liquid cartridge receivers 312. In other words, the liquid delivery system 308 may include print liquid reservoirs to receive print liquid from the liquid cartridges inserted into the liquid cartridge receivers 312.

Furthermore, the 3D printer 300 includes at least two material cartridge receivers 314 and 316 to receive and hold material cartridges containing build material such as build powder for the 3D printing. In some examples, new material cartridges can be inserted into each receiver 314 and 316, respectively, and the 3D printer 300 rely on two new material cartridges for provision of new material as build material. Also, recycle material cartridges may be inserted into each receiver 314 and 316, respectively, and the 3D printer 300 rely on two recycle material cartridges. The printer 300 may include an integrated conveying system 318, such as a pneumatic conveyance system, to facilitate transport of material from the material cartridges in the receivers 314 and 316 as build material for the 3D printing.

In one example, one material cartridge receiver 314 is a new material cartridge receiver, and the other material cartridge receiver 316 is a recycle material cartridge receiver. Note, however, the cartridge receivers 314 and 316 may not be fixed-dedicated for new material or recycle material in certain examples. In other words, the printer 300 may include conduits or ducting and associated control valve(s) that provide for flexibility with the respective operating designation (e.g., new material or recycle material) of the cartridge receivers 314 and 316.

When a new material cartridge is substantially or fully depleted, e.g., when the 3D printer 300 has consumed the contents of the material cartridge, the material cartridge may be removed by the user and re-purposed for later use in the recycle material slot or receiver 316. In one example, the empty cartridge as a recycle material cartridge in a recycle material receiver 316 may receive excess or unfused powder from the printer at the conclusion of a print job. The material cartridge in the recycle material receiver 316 containing recycle material may then supply or otherwise provide recycle material for printing.

User removal of the emptied new-material cartridge may generally occur soon or immediately after emptying, so the 3D printer 300 can be replenished with more new material from another new material cartridge to be inserted. However, the re-installation or re-use of the empty and now "recycle" cartridge may not occur for some time. The empty recycle cartridge may be stored away from the printer 300 until recycle material is to be received by the 3D printer 300. In other words, the user may retain the recycle cartridge in storage external to the printer 300 for future use by the printer 300. Indeed, the user may store many of the empty recycle cartridges. The 3D printer 300 may request the user to re-install an empty or not completely-full recycle cartridge in a slot such as the recycle material receiver 316. Moreover, multiple material types may be employed by a 3D printer at different times and therefore labels, markings, indicators, or other techniques may facilitate accounting of recycle material types in the recycle cartridges. Indeed, two materials or two recycle materials could be different such as one a base material and the other a flow aide, etc.

The 3D printer 300 may also have a new material vessel 320 and a recycle material vessel 322 both internal within the 3D printer 300 housing. The printer 300 may also have additional material vessels internal within the printer 300. The new material vessel 320 may receive new material as build material from the new material cartridge inserted into the new material receiver 314. The recycle material vessel 322 may receive recycle material as build material from the recycle material cartridge inserted into the new material receiver 316. In some examples, the recycle material vessel 322 may receive excess build material recovered from the 3D printing. Such recovered material may flow into the recycle material vessel 322 from a build enclosure or reclaim vessel, and the like. In some examples, the printer 300 may include a build-material reclaim system to separate unfused build material from fused build-material after the generation of a 3D object. Moreover, in certain examples, the vessels 320 and 322 may be operationally-removable from the printer 300.

If internal material vessels 320 or 322 are employed, the conveying system 318 may receive material from the material vessels 320 and 322 for transport for the 3D printing. Generally, each layer of build material processed on the build platform may be a mix of new build material and recycle build material, although the build material or a layer of build material on the build platform may be all new material or all recycle material in particular examples.

The conveying system 318 may include a dispense vessel at or near the end of the conveying system 318 to discharge build material for the 3D printing, such as for the build platform and associated build enclosure. To do so, in one example, the conveying system 318 may provide the build material through the dispense vessel to a feed handling system 324 which may provide build material for the build enclosure and build platform.

The conveying system 318 may transport both new material and recycle material as build material for the 3D printing. The conveying system 318 may provide build material having a specified ratio of new material to recycle material. The ratio may range from zero, e.g., no new material, all recycle material, to 1.0, e.g., all new material, no recycle material. The ratio may be a weight ratio, volume ratio, or other type of ratio. The ratio as a weight ratio or volume ratio may range from 0.01 to 0.99, 0.05 to 0.95, 0.1 to 0.9, 0.15 to 0.85, 0.2 to 0.8, 0.25 to 0.75, 0.3 to 0.7, etc. In a particular example, the feed through the dispense vessel may be 20% new material by weight and 80% recycle material by weight, yielding a weight ratio of 0.25. In another example, the feed has 20% new material by volume and 80% recycle material by volume, yielding a volume ratio of 0.25.

As mentioned, the 3D printer 300 may include the feed handling system 324 to receive the build material from the conveying system 318 or dispense vessel. The feed handling system 324 may provide a desired amount of build material for each layer of build material on the build platform. The feed handling system 324 may include a build-material applicator 326 to distribute the build material across the build platform. The build-material applicator 326 may include a powder spreader, powder spreader arm, mechanical arm, or roller, and so forth. Moreover, in some examples, the build material-applicator 326 is not a component of the feed handling system 324 as depicted but instead is a component separate from the feed handling system 324. Also, the build-material applicator 326 may be moved by a movement device, such as a carriage. If so, the movement device may be a movement device in the thermal fusion system 302. The build-material applicator 326 may reside on a dedicated movement device or may share a movement device with the energy source 306 or the print assembly 304.

The feed handling system 324 may include a feeder or valve near or at a discharge of the dispense vessel. The feeder may be, for example, a rotary valve. The feed handling system 324 may also include an additional feed apparatus such as a dosing container or dosing box that receives build material from the dispense vessel through the rotary feeder valve. The dosing container may be disposed at or near the rotary feeder valve. Build material may discharge from the dosing container to, for example, to a surface adjacent the build platform for the build-material applicator 326 to spread the dosed build material across the build platform. Such dosing and spreading may be repeated for each layer of build material applied to the build platform.

As indicated, the 3D printer 300 may have the build platform to receive build material to form the 3D object. In one example, the build platform is removable and the 3D printer may be manufactured and sold without the build platform inserted in the 3D printer. The 3D printer may also have a build enclosure which may at least partially contain or otherwise be associated with the build platform on which the 3D printer forms the 3D object. The build enclosure may be a build bucket, build chamber, build housing, and the like. The build enclosure and the build platform may be components of a build unit of the printer. As indicated, for particular examples, the build unit may be operationally removable from the 3D printer.

In all, the 3D printer 300 may include interfaces to receive a plurality of build material cartridges and print liquid cartridges. Further, the printer 300 may have a selective solidification module or thermal fusion module 302. The printer may also include a build unit processing module to separate printed objects from unfused material. In addition, the 3D printer 300 may include a 3D printed object recovery zone from which separated 3D objects may be recovered after unfused material extraction. One of the material cartridge interfaces, e.g., receiver 314, may receive a first cartridge of fresh build material. Another cartridge interface, e.g., receiver 316, may receive a refillable cartridge to collect unfused recycled build material to facilitate removal of material from the printer. In this way, the 3D printer provides separate outputs for 3D printed objects and recycled build material.

Recycled material cartridges may be removed and stored for future use or disposed. Once a fresh material cartridge has been emptied by the 3D printer, empty fresh material cartridge may be reinserted into the second cartridge interface, e.g., receiver 316, as an empty recycle material cartridge to receive unfused recycled build material. Lastly, the build material cartridges may be automatically excited within the printer to de-agglomerate build materials that have been stored for periods of time.

One example of the present techniques is directed to a 3D printer having at least one cartridge receiver, e.g., slot, receptacle, cavity, etc., to receive a material cartridge. The 3D printer may supply material from the material cartridge as build material for printing. The 3D printer may also receive material into the material cartridge, such as excess build material from the 3D printing. A conveying system of the 3D printer may facilitate transport of new material and recycle material to, for example, a build enclosure, e.g., build chamber, build bucket, etc., which may at least partially contain or otherwise be associated with the build platform on which the 3D printer prints the 3D object. A print assembly such as a printbar may eject print liquid, e.g., printing agents, onto the build material on the build platform to selectively fuse portions of successive layers of build material on the build platform to print the 3D object. The printer may include an energy source, e.g., heat lamps, infrared light source, etc., to apply energy to the build material and, thus, to the print liquid ejected onto the build material on the build platform to fuse the selected portions of each laser of build material on the build platform. The printer may include a delivery system to make available the print liquid. Multiple printing agents or other compounds may be employed as the print liquid.

Figure 4:
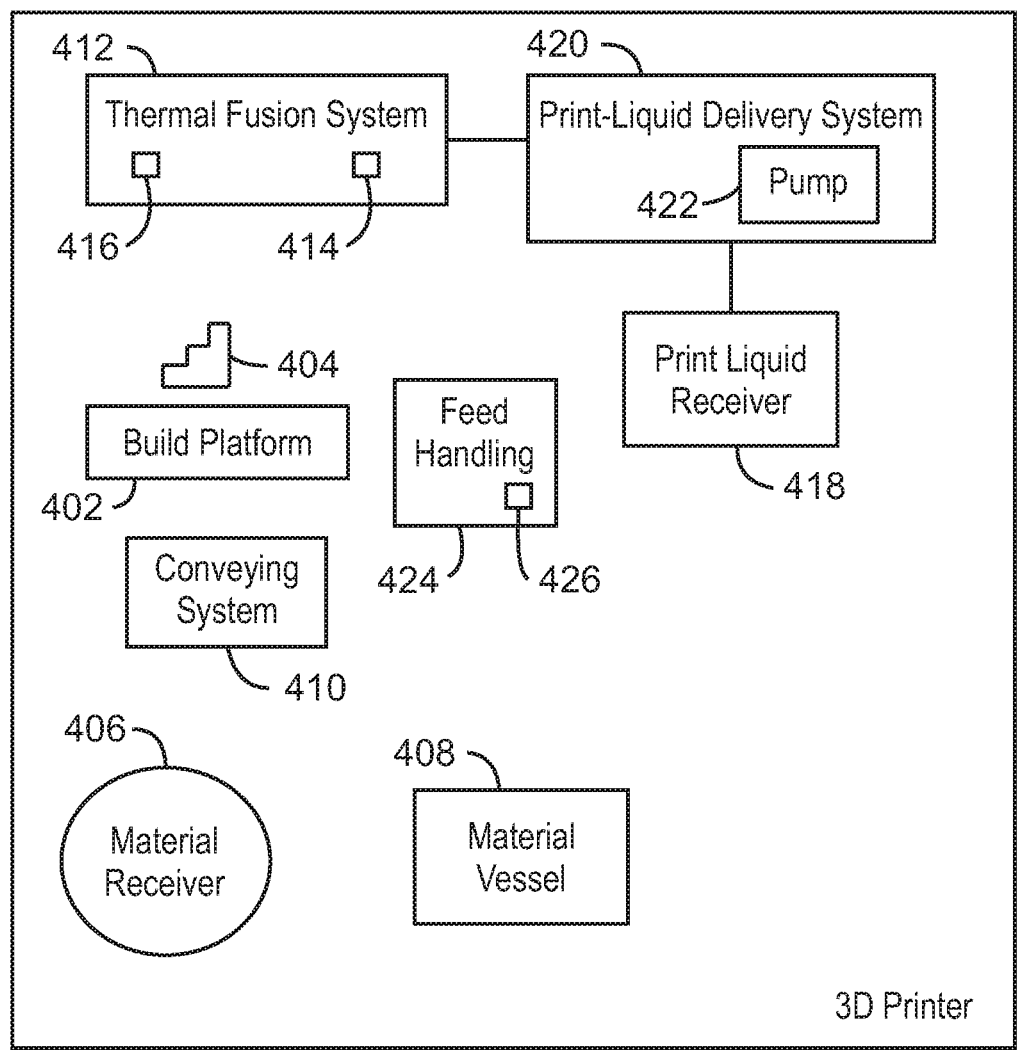
FIG. 4 is a block diagram of a 3D printer in accordance with examples of the present techniques.

FIG. 4 is a 3D printer 400 having a build platform 402 to form a 3D object 404. The 3D printer 400 may apply build material to the build platform 402 and generate the 3D object from the build material on the build platform 402. The build platform 402 may be associated with a build enclosure (not shown) of the 3D printer 400. In some examples, the build enclosure may at least partially contain the build platform 402. Moreover, the build enclosure and the associated build platform 402 together may constitute a build unit. In certain examples, the build unit may be operationally removable. Indeed, while FIG. 4 depicts a build platform 402, the printer 400 may be manufactured and sold without the build platform 402 in examples with a removable build unit. In other examples, the build unit is not intended to be operationally removable.

The 3D printer 400 may include one or more material cartridge receivers 406 to hold a material cartridge for supply of build material for the build platform 402. The printer 400 may also include one or more material vessels 408 integrated with the printer 400 to accept build material from the material cartridge(s) in the cartridge receiver(s) 406. The printer 400 may include an integrated conveying system 410 to transport build material from the material vessel(s) 408 or from material cartridge(s) in the material cartridge receiver(s) 406. In some examples, the conveying system 410 may be a pneumatic conveyance system.

In the illustrated example, the conveying system 410 transports the build material to a feed handling system 424. For instance, the conveying system 410 may deliver the build material through a vessel, such as a feed vessel or dispense vessel, to the feed handling system 424 of the printer 400. A feeder at an exit of the dispense vessel may discharge or provide build material to the feed handling system 424. The exit may be a solids discharge port or outlet of the vessel. The feeder that may receive build material from the vessel and provide the build material to the feed handling system 424 may be a rotary valve, screw feeder, or auger, and the like.

The feed handling system 424 may include a feed apparatus 426, such as a dosing device or container, to receive the build material from the feeder or dispense vessel and provide a specified amount for the build platform 402. The specified amount may be a specified volume or specified weight. In some examples, the specified amount may be fixed or determined at least in part by an operating condition of the feeder or by a volume of the dosing container, and the like. Moreover, the specified amount of build material may be repeatedly released by the feed apparatus 426 for successive layers of build material on the build platform 402.

The feed apparatus 426 as a dosing container may be, for example, a dosing box that releases build material for the build platform 402. The feed apparatus 426 may, for instance, release the specified amount of build material for a build-material applicator, such as a powder spreader, to disperse the build material across the build platform 402. In one example, the feed apparatus 426 discharges build material to a surface in the printer 400 adjacent to the build platform 402. The build-material applicator may move across the surface to displace the build material from the surface to across the build platform 402.

In the illustrated example, the 3D printer 400 includes a thermal fusion system 412 having a print assembly 414 and an energy source 416 to fuse targeted portions of build material on the build platform 402 to generate the 3D object 404. The print assembly 414 may include a printbar having nozzles to eject print liquid onto the targeted portions of build material. The presence of print liquid on the targeted or selected portions of the build material may increase transfer of energy from the energy source 416 into those portions of build material on the build platform 402. In operation, targeted portions for successive layers of build material may be selected via computer implementation based on a 3D model or other electronic data source.

Thus, a print assembly 414, such as a printbar, may selectively eject a print liquid, e.g., fusing agent, onto the build material on the build platform 402 for a layer of the 3D object 404. Again, the selective ejections may be based on a 3D object model of the object 404 to be generated. The energy source 416, such as a light source or heat source, may selectively fuse or cause selective fusion of the material on the build platform 402 to form a layer of the 3D object 404 via application of energy to the print liquid and build material. The powder spreader or other build-material applicator may disperse more build material across the surface of the build platform 402 to form the next layer. The print assembly 414 may eject further print liquid onto the build material on the build platform 402, and the energy source 416 apply energy, to form the next layer. Indeed, the additional build material may be selectively fused to form the next layer of the 3D object. This repeated dispersion of build material onto the build platform 402 and ejection of fusing agent onto the build material on the build platform 402 (and application of energy) may continue for successive layers until the 3D object 404 is formed. The 3D printer 400 may lower, e.g., via a piston, the build platform 402 incrementally as the targeted portions on each successive layer of build material are fused and the 3D object 404 is formed layer-by-layer.

The 3D printer 400 includes a print-liquid cartridge receiver 418 to hold a print liquid cartridge. The printer 400 may generally include multiple such receivers 418. In one example, the printer 400 has at least seven print-liquid cartridge receivers 418 to receive seven respective print-liquid cartridges. The print-liquid cartridge receiver 418 may make available print liquid from the inserted print-liquid cartridge for a delivery system 420. The print liquid may include a fusing agent, a curing agent, a binding agent, a detailing agent, a coloring agent, a fusing coloring agent, or any combinations thereof.

The 3D printer 400 may include the delivery system 420 to provide print liquid from the print liquid cartridge in the print-liquid cartridge receiver 418 to the print assembly 414. In some examples, the delivery system 420 may include at least one pump 422 to provide a motive force to convey the print liquid. Further, the delivery system 420 may have a liquid vessel, e.g., container, reservoir, etc., that may provide surge capacity, feed volume, residence time, and the like. Moreover, for a delivery system 420 that employs such a liquid vessel, the delivery system 420 may include a pump 422 to move print liquid from the liquid cartridge in the liquid-cartridge receiver 418 to the liquid vessel, and another pump 422 to deliver the print liquid from the liquid vessel to the print assembly 414.

Figure 5:
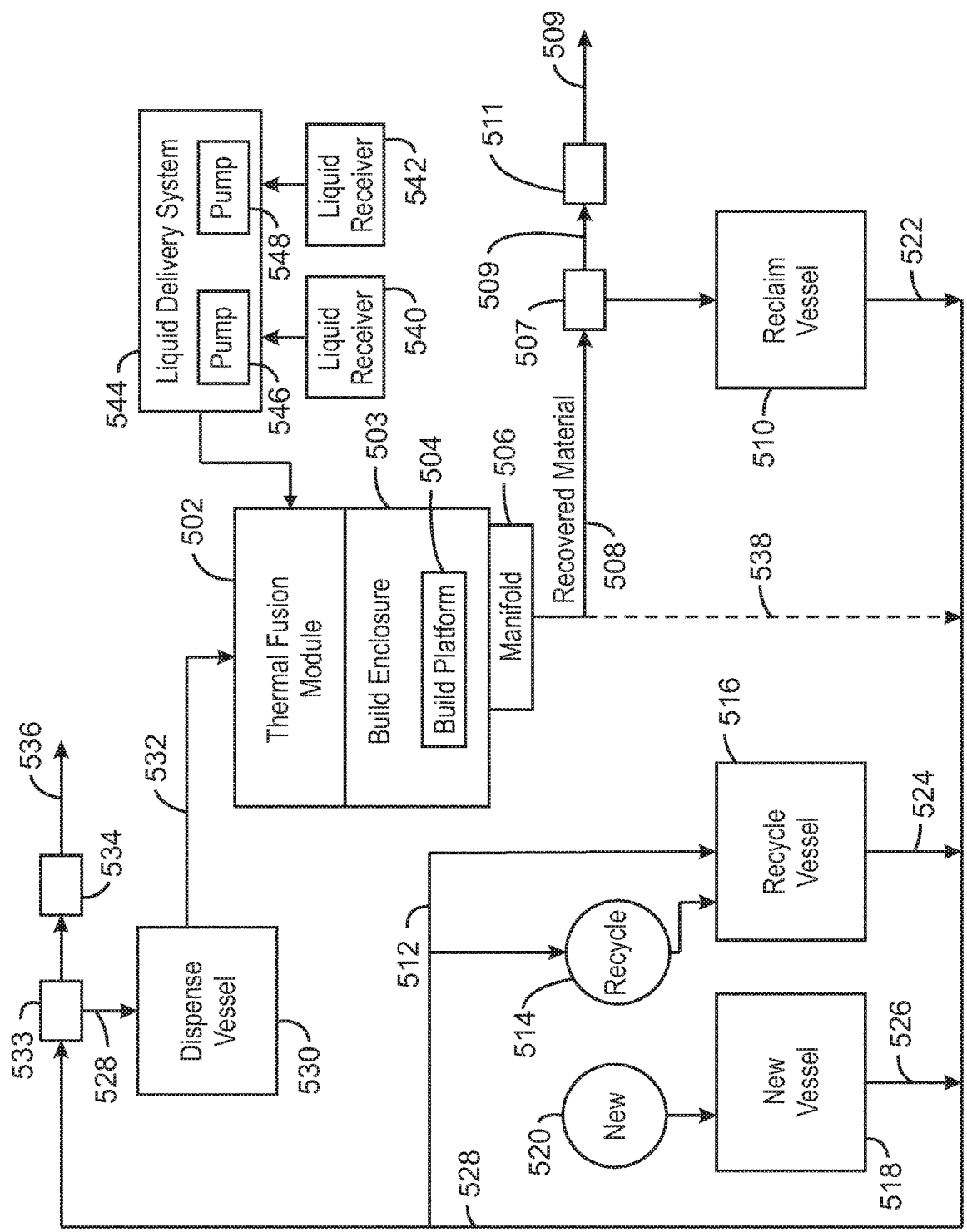
FIG. 5 is a schematic diagram of a 3D printer in accordance with examples of the present techniques.

FIG. 5 is a 3D printer 500 including a thermal fusion module 502 and a build platform 504. A build enclosure 503 may be associated with the build platform 504. In some examples, the build enclosure 503 at least partially contains the build platform 504. The 3D printer 500 may provide, via a feed conveying system, feed material or build material (e.g., powder) for the build platform 504. In particular, a printer feed conveying system may provide the feed build material through the dispense vessel 530 to a powder handling system (not shown). The powder handling system may include, for example, a feed dosing apparatus for a build-material applicator or powder spreader to distribute the feed build material across the build platform 504. Thus, the feed conveying system may facilitate providing build material for the thermal fusion module 502 to apply print liquid and energy to the build material on the build platform.

As used herein, the term "powder" as build material can, for example, refer to a powdered, or powder-like, material which may be layered and fused via a fusing agent during a print job of a 3D printing process. The powdered material can be, for example, a powdered semi-crystalline thermoplastic material, a powdered metal material, a powdered plastic material, a powdered composite material, a powdered ceramic material, a powdered glass material, a powdered resin material, or a powdered polymer material, among other types of powdered material.

The printer 500 may include a manifold 506 to withdraw excess build material or excess powder, e.g., powder not becoming part of a 3D object, from the build enclosure 503 as recovered material 508. In examples, such is performed after generation of the 3D object is complete. In one example, this withdrawal of excess material from the build enclosure 503 is performed after completion of the generation of the 3D object or after completion of the print job. In another example, such withdrawal of excess build material is performed both during the print job and after completion of the print job.

The manifold 506 may be operationally coupled to a motive component 511 such as a vacuum pump, a blower, a venturi, an eductor, a steam jet, or any combinations thereof. The printer 500 may convey the recovered material 508 via the manifold 506 and by motive component 511 to a reclaim vessel 510. The recovered material 508 and conveying fluid (e.g., air, gas, etc.) may flow through a separation system 507. The separation system 507 may include a cyclone, filter, etc. to separate conveying fluid 509 from the recovered material 508. The separated conveying fluid 509 may discharge through the motive component 511, such as to the environment or to other equipment for additional processing. The separation system 507 or the reclaim vessel 510 may include a sieve(s), screen(s), filter(s), etc. to separate larger particles (e.g., agglomerated or partially-fused particles) from the recovered material 508.

In certain examples, the recovered material 508 may bypass the reclaim vessel 510, as indicated by reference numeral 538. If so, the recovered material 508 may be transported via the feed conveying system to, for example, a recycle material cartridge in a recycle cartridge receiver 514 or to a recycle material vessel 516, as indicated by reference number 512. The recycle material vessel 516 may also be provisioned by the recycle material cartridge in the recycle cartridge receiver 514. Likewise, a new material vessel 518 may be supplied by a new material cartridge in the new cartridge receiver 520. In some examples, the recycle cartridge receiver 514 and the new cartridge receiver may be disposed closer to the bottom of the printer 500 than to the top of the printer 500.

Moreover, printer 500 may combine the recovered material 508 with recycle material 524 and fresh or new material 526. The recycle material vessel 516 and the new material vessel 518 may provide the recycle material 524 and new material 526, respectively. In some examples, the recycle material 524 and the new material 526 may be provided to give a desired or specified ratio (e.g., weight ratio or volume ratio) of new material 526 to recycle material 524. The recovered material 508 may have the desired or specified ratio of new material 526 to recycle material 524, or may be classified, for example, as 100% recycle material. The feed material 528 fed to the dispense vessel 530 for the thermal fusion system 502 and build platform 504 may include recycle material 524, new material 526, or the recovered material 508, or any combinations thereof. The various materials 524, 526, and 508 may mix in-line as the feed 528 is in route to the dispense vessel 530 in certain examples.

In some examples, the feed 528 may include recovered material 522 from the reclaim material vessel 510, recycle material 524 from the recycle material vessel 516, and new material 526 from the new material vessel 518. In examples or operations without recovered material 522, the new material 526 and recycle material 524 may form the feed material 528 as the material is transported to the dispense vessel 530. The dispense vessel 530 may provide the feed material 528 as build material 532 for the build platform 504. In a particular example, the build material 532 may discharge from the dispense vessel 530 through a feed apparatus or dosing device for a build-material applicator to spread the build material 532 across the build platform 504.

A control system may facilitate the feed material 528 composition and build material 532 composition having a specified ratio of new material to recycle material. The control system may facilitate delivery of a specified ratio, for example, by accommodating metering or regulating of the weight or volume of material dispensed from the new material vessel 518 and recycle material vessel 516.

In the illustrated example, as discussed, the reclaim material 522, recycle material 524, and new material 526 may be fed as feed material 528 to a dispense vessel 530. The 3D printer 500 may include a conveying system to facilitate transport of the feed material 528 to the dispense vessel 530 and to the build enclosure 503. The conveying system may be an internal conveying system integrated within the printer 500.

In some examples, the conveying system includes a pneumatic conveying system. If so, the pneumatic conveying system may include a vacuum component 534 which may be a blower, venturi, eductor, or steam jet, or any combinations thereof. The pneumatic conveyance system may be dense phase or dilute phase. If dilute phase, the pneumatic conveyance system may be positive pressure conveying or negative pressure conveying. In the illustrated example with the vacuum component(s), the pneumatic conveyance system may be dilute-phase negative pressure or vacuum. The pneumatic conveying air 536 may discharge through the vacuum component(s) 534. The feed material 532 minus most or all of the conveying air 536 may flow, e.g., by gravity, air flow, etc., from the dispense vessel 530 to the build enclosure 503 or to other printer components for printing of a 3D object on the build platform 504. In one example, the feed build material flows out of the dispense vessel 530 to a build-material applicator that spreads build material 532 across the build platform 504 at the build enclosure 503. In a particular example, the build-material applicator includes a dosing box and a powder spreader.

The 3D printer 500 may also provide for internal delivery of print liquid. For example, the printer 500 may have a liquid cartridge receiver 540 and another liquid cartridge receiver 542. The printer 500 may have additional liquid cartridge receivers in addition to the two depicted. The liquid cartridge receivers 540 and 542 may each receive a print liquid cartridge. The print liquid cartridge may contain print liquid.

In some examples, the print liquid may include fusing agents to encourage fusing of the build material. In one example, a fusing agent absorbs near IR light to promote melting or fusing of the build material. The fusing agents may be tailored to absorb energy such as light to promote heating and fusing of the build material on the build platform 504. The fusing agents may include a vehicle or carrier to hold particles that absorb light or radiation. The print liquid may also include detailing agents which inhibit fusing of the build material on the build platform 504. The print liquid may include coloring agents including for colors such as black, cyan, magenta, yellow, and so forth. While the build material may be generally white in some examples, the 3D object as formed may be a color other than white, such as gray. The print liquid as coloring agents may be applied for cosmetic reasons and other reasons. The print liquid may also be generally clear or low tint. The print liquid may include pigmented inks, specially-formulated inks, and so on. Lastly, as mentioned, the print liquid may also be binding agents or curing agents, and the like.

The 3D printer 500 may include a liquid delivery system 544 internal to the printer 500 to supply print liquid from the print liquid cartridges in the liquid cartridge receivers 540 and 542 to the thermal fusion module 502. In particular, the liquid delivery system 544 may provide the print liquid to a print assembly of the thermal fusion module 502. In examples, the print assembly is a printbar having print nozzles to eject print liquid onto build material on the build platform 504.

The liquid delivery system 544 may include at least two pumps 546 and 548 to provide motive force such as pump head or pressure differential to push or convey the print liquid through conduits in the liquid delivery system 544 to the thermal fusion module 502. In one example, the first pump 546 receives print liquid from the print liquid cartridge in the first liquid cartridge receiver 540, and the second pump 548 receives print liquid from the print liquid cartridge in the second liquid cartridge receiver 542. The pumps 546 and 548 may be positive displacement pumps or centrifugal pumps, or other types of pumps.

In some examples, the liquid delivery system 544 may include vessels, such as reservoirs, to hold print liquid. For instance, in the illustrated example, the delivery system 544 may include a first liquid vessel to receive print liquid made available from the print liquid cartridge in the first liquid cartridge receiver 540. The delivery system 544 may include a second liquid vessel to receive print liquid made available from the print liquid cartridge in the second liquid cartridge receiver 542. If so, for a particular example, the depicted first pump 546 may represent two pumps, one upstream of the first liquid vessel and another downstream of the first liquid vessel. Likewise, the depicted second pump 548 may represent two pumps, one upstream of the second liquid vessel and another downstream of the second liquid vessel.

Figure 6:
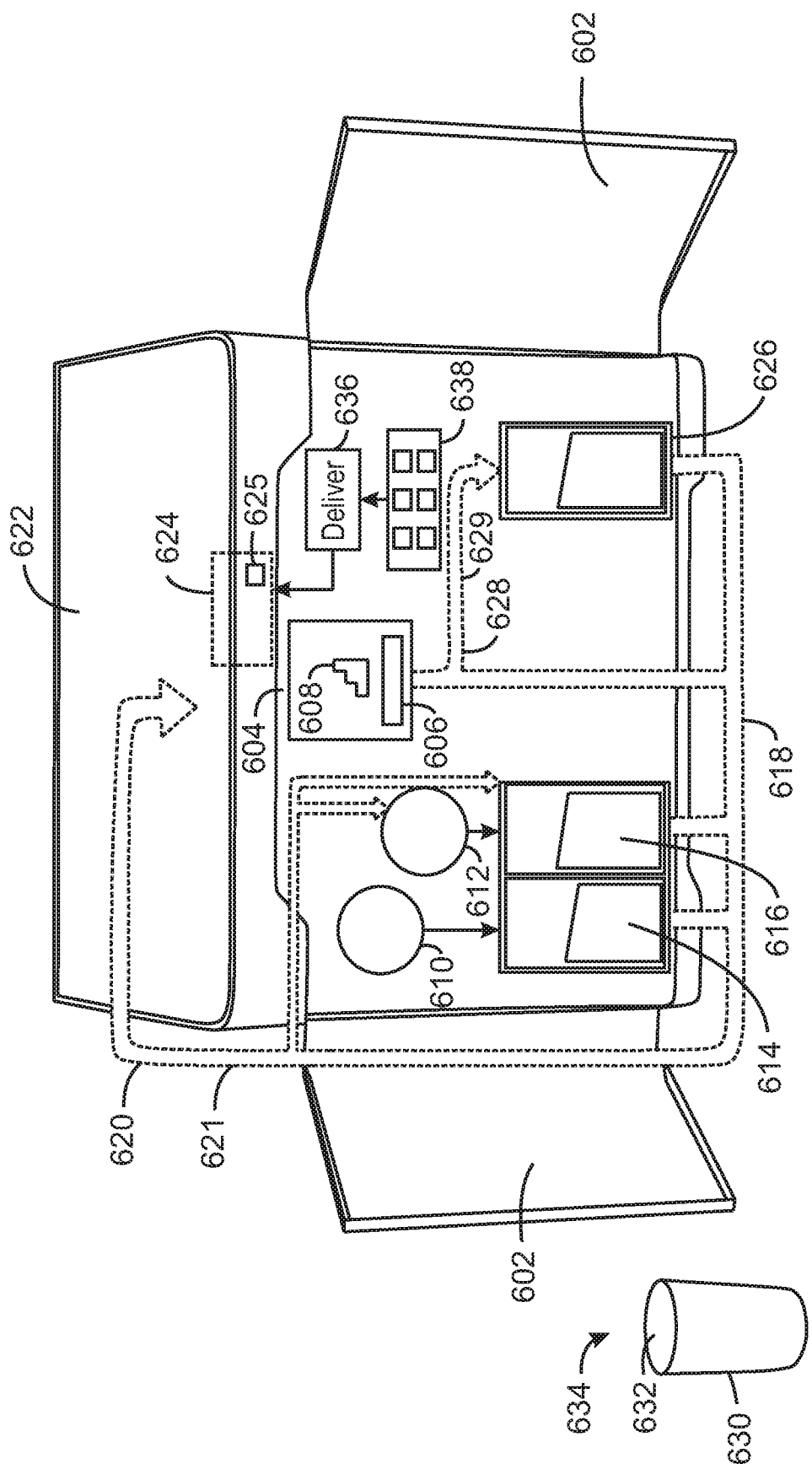
FIG. 6 is a diagram of a 3D printer in accordance with examples of the present techniques.

FIG. 6 is a 3D printer 600 shown with its front access panels 602 open and an interior portion of the 3D printer 600 visible. The 3D printer 600 may include a build enclosure 604. The build enclosure 604 may be associated with a build platform 606 on which a 3D object 608 is formed from feed material composed of a mix, as described above, of new material and recycle material. The 3D printer 600 may include a new cartridge receiver 610 that receives and holds a new material cartridge to make new material available from the new material cartridge to the 3D printer 600 as build material. The 3D printer 600 may include a recycle cartridge receiver 612 to receive and hold a recycle material cartridge to accept excess material recovered from the build enclosure 604. In addition, the recycle cartridge receiver 612 may make recycle material available from the recycle material cartridge to the 3D printer 600 as build material for the 3D printing. Moreover, the printer 600 may determine when an internal recycle vessel or hopper is full and instruct a user to insert an empty or partially-empty material cartridge which can then be filled with recycle material from the full internal recycle vessel.

In particular examples, the new cartridge receiver 610 or other component may rotate the new material cartridge to prevent, reduce, break up, or dislodge agglomeration of the powdered new material in the new material cartridge. Likewise, the recycle material cartridge may rotate in the recycle cartridge receiver 612 to prevent or reduce agglomeration of the powdered recycle material in the recycle material cartridge. If such rotation is employed, the new material cartridge and the recycle material cartridge may be filled or emptied while the cartridges are rotating in one example. In one example, the printer 600 and the cartridge receivers 610 and 612 do not provide for rotation of the material cartridges to reduce agglomeration.

The 3D printer 600 may include a new material vessel 614 internal in the printer 600 to receive new material from the new material cartridge in the new cartridge receiver 610. The printer 600 may include a recycle material vessel 616 internal in the printer 600 to receive recycle material from the recycle material cartridge in the recycle cartridge receiver 612. The new material from the new material vessel 614 and the recycle material from the recycle material vessel 616 may be provided to a first conveying system 621. For example, the new material may flow from the new material vessel 614, such as with the aid of gravity, through a feeder to a conduit of the first conveying system 621. Likewise, the recycle material may flow from the feed material vessel 616, such as with the aid of gravity, through a feeder to a conduit of the first conveying system 621. The respective feeder disposed at a solids discharge of each vessel 614 and 616 may be a rotary valve, screw feeder, auger, and the like.

The new material and the recycle material may intermingle or mix in-line as the material moves through the first conveying system 621. In one example, a mixing device such as a baffle or static mixer is employed in-line in a conveying conduit. In another example, the first conveying system 621 is a pneumatic conveyance system in which the material is conveyed at a relatively high velocity which may promote mixing without use of a mixing device. The mix of new material and recycle material 620 may be supplied via the first conveying system 621 for the build platform 606.

In FIG. 6, a dashed box is a representation of the thermal fusion module 624 which may include several components, including components that operationally move over the build enclosure 604 and build platform 606. The thermal fusion module 624 generally may include an energy source to apply energy to the build material on the build platform 606. Energy from the energy source may be applied to the build material to form a layer or layers of the 3D object 608. The movement of the energy source over the build platform 606, and the application of energy in certain examples, may be under computer control.

The thermal fusion module 624 may also include a printbar 625 to eject print liquid onto the build material on the build platform 606. In some examples, the printbar 625 may have nozzles to eject the print liquid. Moreover, the printbar 625 may eject the print liquid to particular points, lines, or regions on the build material to fuse those portions of the build material in forming each layer of the printed 3D object 608. The movement and positioning of the printbar 625 over the build platform 606, and the ejecting of the print liquid, may be according to a 3D model under computer control.

The 3D printer 600 may include a print-liquid delivery system 636 internal to or integrated with the printer 600 to provide print liquid to the printbar 625. The print-liquid delivery system 636 may receive print liquid from removable print liquid cartridges inserted into the printer 600. For example, the printer 600 may include an assembly 638 of liquid cartridge receivers (e.g., slots or cavities) to hold print liquid cartridges. Indeed, the assembly 638 may have multiple receivers to receive multiple liquid cartridges. The delivery system 636 may receive print liquid from print liquid cartridges inserted into the assembly 638 having the liquid cartridge receivers for holding the print liquid cartridges. The delivery system 638 may include pumps, conduits, vessel or reservoirs, and other components, to receive print liquid from print liquid cartridges and to supply print liquid to the thermal fusion module 624 or printbar 625.

In the example shown in FIG. 6, the 3D printer 600 has doors or access panels 602 and a top surface 622. Indeed, the printer 600 may generally have a partial or overall enclosure to house printer 600 components. Some printer 600 components may be readily removable or operationally removable, whereas other printer 600 components may be more static or intended to not be regularly removed. Lastly, the conduits indicated, for example, by reference numbers 618 and 620 are representations of general flow of material or powder via the first conveying system 621. The printer 600 conduits (e.g., piping, tubing, etc.), fittings, and valves associated with such flow of material and the first conveying system 621 may be housed inside the printer 600 in some examples.

Excess build material, e.g., unsolidified material, may be recovered from the build enclosure 604. For example, a second conveying system 629 may recover and convey the excess build material 628 from a bottom portion (or other portions) of the build enclosure 604 to the reclaim vessel 626. In some examples, the second conveying system 629 applies a vacuum to the build enclosure 604 to recover the excess build material 628. In certain examples, the excess material 628 may be subjected to filtering, separation, or other processing as part of the second conveying system 629 or as associated with the reclaim vessel 626 to remove larger particles, air, and so forth, prior to the excess material entering the reclaim vessel 626.

The first conveying system 621 may transport the recovered material from a discharge on a bottom portion of the reclaim vessel 626 as recycle or reclaim material 618 to the recycle material cartridge in the recycle cartridge receiver 612 or to the recycle material vessel 616. In some examples, the reclaim vessel 626 may be labeled as a second recycle vessel. In addition, or if there is no reclaim vessel 626, excess material 628 recovered from the build enclosure 604 may proceed directly to the first conveying system 621, such as to a conduit(s) of the first conveying system 621 transporting the reclaim material 618.

A build unit processing module may include or involve a build unit including the build enclosure 604 and the build platform 606. The build platform 606 may have holes to allow unsolidified powder to flow through the build platform 606. In addition, the build unit processing module may include sieves, vibration sources such as a motor with an eccentric or off-center mass, air flow devices, and other components to remove excess build material, e.g., unsolidified powder, from the build platform 606. The 3D object 608 disposed on the build platform 606 may cool at an accelerated rate after the excess material or powder is removed from the build enclosure 604. In other words, the 3D object 608 may cool faster with surrounding excess build material removed. In this fashion, the build unit processing module may manage the cooling process, e.g., by removing the excess build material. The build unit processing module may provide for discharge of excess material 628 from the build enclosure 604.

At the conclusion of a print job and after most or all of the excess or unsolidified material or powder is removed from the build enclosure 604, the build enclosure 604 may include a 3D object 608 with partially-solidified powder caked on the outside of the 3D object 608. In certain examples, this partially-solidified powder may be removed by a bead blaster, a brush, or other tools that may be part of the build unit processing module. Partially-solidified powder may be removed from the build enclosure 604. Partially-solidified powder may be removed from the 3D object in the build enclosure 604 or after the 3D object has been removed from the build enclosure 604.

Furthermore, in some examples, the printer 600 may have a 3D-printed-object recovery zone. Indeed, once some or most of the unsolidified powder has been removed from the 3D object 608 (and from the build enclosure 604), the 3D object 608 may be recovered via the 3D-printed-object recovery zone in those examples. In operation, the build platform 606 may be manually or automatically lifted, e.g., via an underlying piston, towards the top of the build enclosure 604 to the recovery zone so that a user may recover the 3D object 608. In an example, this 3D-printed-object recovery zone may be accessed by a user or machine through a top or side opening of the 3D printer 600. The opening may be through an outer housing or casing of the 3D printer 600. In some examples, the zone may be accessed by lifting a lid or a removable top of the 3D printer 600. In other examples, a door(s) of the 3D printer may be opened to access the zone.

The recovery zone may include tools to remove any remaining free build material or powder from the 3D object 608 and to clean the build platform 606. The 3D-printed-object recovery zone may also include containers to store printed 3D objects, a light source to illuminate the zone, and devices to provide air flow to prevent or reduce excess build material from exiting the 3D printer 600 during recovery of the printed 3D object, and so on.

Lastly, FIG. 6 depicts a material cartridge 634 that may be inserted into cartridge receivers 610 or 612. The cartridge 634 as depicted is only an example, and may have a top surface 632 and include a container or housing 630 to contain or hold material such as new material or recycle material. In particular examples, the top surface 632 may have a user-interface to facilitate a user to lift and insert the material cartridge 634 into the receiver 610 or 612 to secure the cartridge 634 in the receiver 610 or 612.

Figure 7:
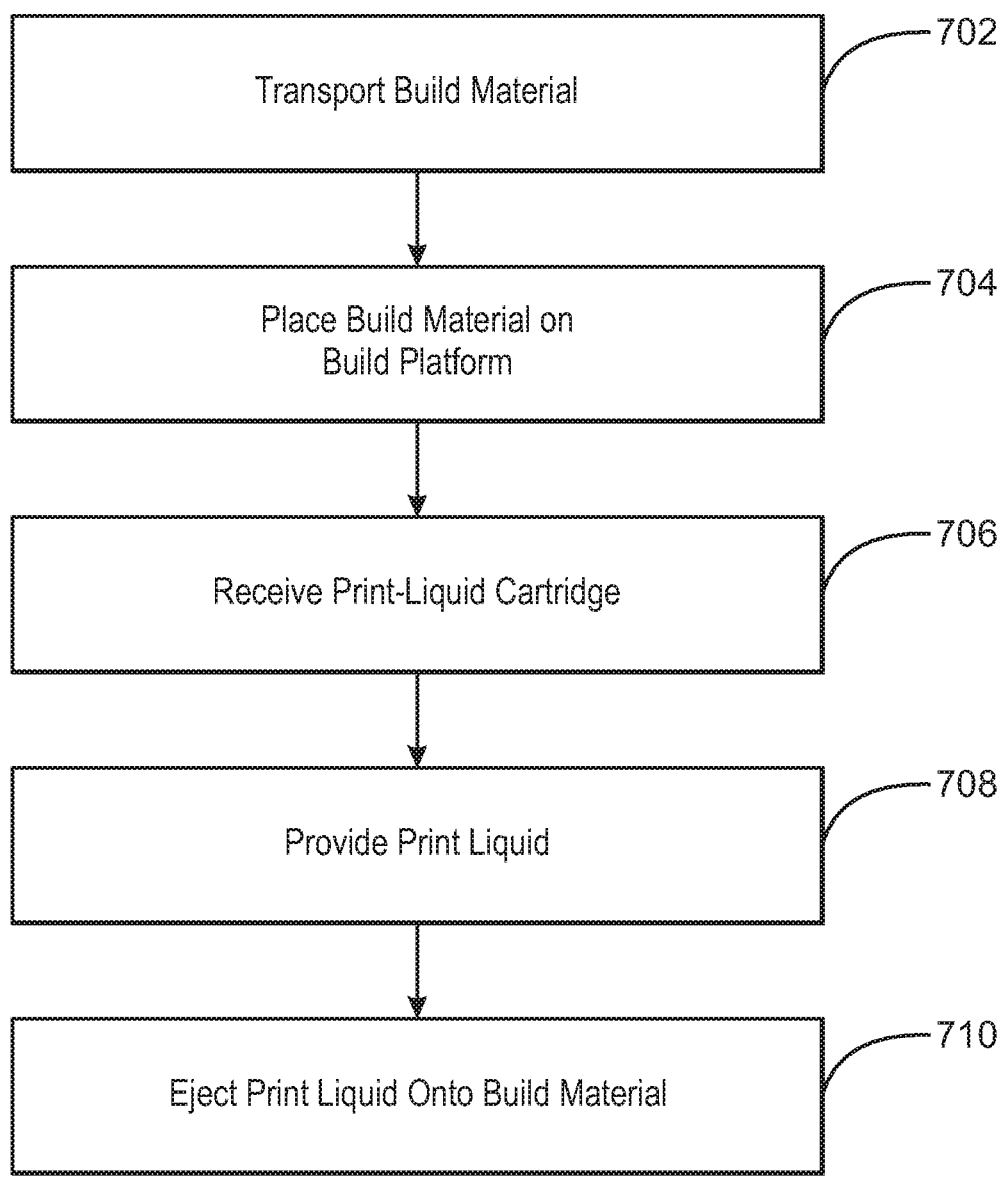
FIG. 7 is a block flow diagram of a method of operating a 3D printer in accordance with examples of the present techniques.

FIG. 7 is a method 700 of operating a 3D printer. At block 702, the method includes transporting, via a conveying system, build material for a powder spreader and a build platform. The conveying system may be a pneumatic conveyance system in certain examples. The build material transported may include recycle material made available from a recycle material cartridge inserted in the 3D printer. Moreover, the method 700 may include receiving into the recycle material cartridge excess build material recovered from a build enclosure associated with the build platform.

The build material transported, via the conveying system, to the powder spreader may include new material made available from a new material cartridge in the 3D printer. The transporting of the recycle material and the new material may include providing the build material having a specified ratio, such as a weight ratio or volume ratio, of new material to recycle material. In one example, the specified ratio is a weight ratio or volume ratio in a range of 0.2 to 0.8. Ratios outside of this range may be employed. Indeed, in some cases the build material transported to the powder spreader may either be all new material (e.g., ratio of 1) or all recycle material (e.g., ratio of 0).

Moreover, in particular examples, the transporting of the recycle material may include receiving the recycle material into a recycle material vessel in the 3D printer from the recycle material cartridge. Likewise, the transporting the new material may include receiving the new material into a new material vessel in the 3D printer from the new material cartridge. The conveying system may receive the recycle material and the new material from the recycle material vessel and the new material vessel, respectively.

At block 704, the method includes placing, via the powder spreader, build material on the build platform, the build material including new material and the recycle material. At block 706, the method includes receiving a print-liquid cartridge into the 3D printer. In some examples, the 3D printer may include a first print-liquid cartridge receiver receiving the print-liquid cartridge and a second print-liquid cartridge receiving a second print-liquid cartridge.

At block 708, the method includes providing, via gravity or a pump in the 3D printer, print liquid from the print-liquid cartridge to a printbar. If a pump is employed, the pump may be a positive displacement pump (e.g., diaphragm pump, gear pump, etc.) or other type of pump. At block 710, the method incudes ejecting, via the printbar, the print liquid onto the build material on the build platform. The ejecting of the print liquid may include ejecting, via the printbar under computer control, the print liquid onto selected portions of the build material on the build platform. The print liquid may include a fusing agent, a curing agent, a binding agent, a detailing agent, a coloring agent, a coloring fusing agent, ink, pigment, or any combinations thereof. Lastly, the method 700 may also include applying energy to the build material on the build platform and thus applying energy to the print liquid ejected onto the build material to form a 3D object from the build material.

Figure 8:
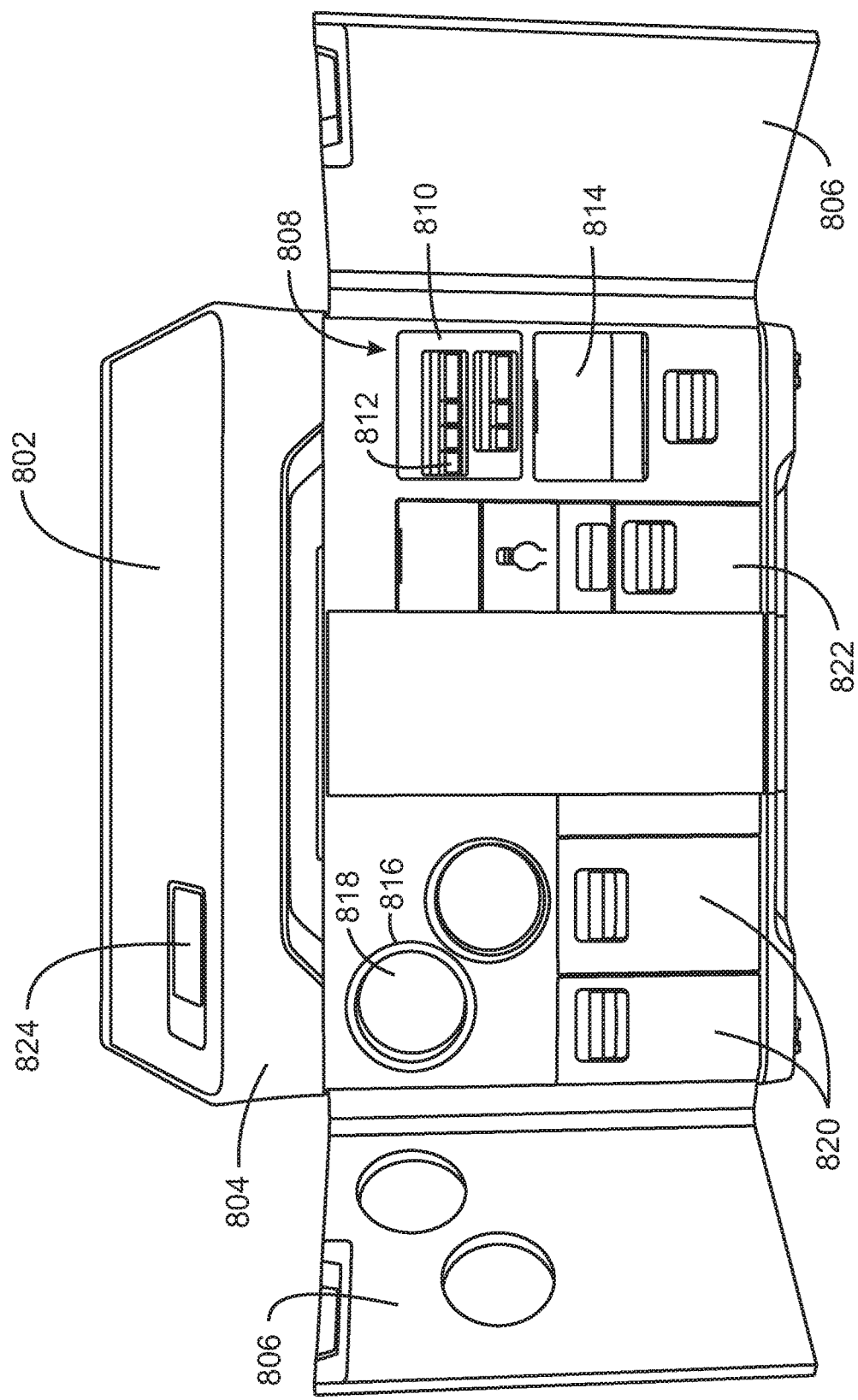
FIG. 8 is a diagram of a 3D printer in accordance with examples of the present techniques.

FIG. 8 is a 3D printer 800 that receives print liquid and build material to generate a 3D object. The build material may be powder. The printer 800 may generally have a housing and with components internal to the housing for handling of print liquid and build material. The printer 800 has a lid 804 and doors or access panels 806. The top surface of the lid 804 is indicated by the reference numeral 802.

The printer 800 includes print-liquid supply system 808 to receive and supply print liquid for the 3D printing. The supply system 808 includes a cartridge receiver assembly 810 to receive and secure removable print-liquid cartridges 812. The supply system 808 includes a reservoir assembly 814 having multiple vessels or reservoirs for holding print liquid collected from the print liquid cartridges inserted into the cartridge receiver assembly 810. The vessels may provide feed capacity or surge capacity of the print liquid. The print liquid may be provided from the vessels or reservoirs to the 3D printing such as to a print assembly or printbar above a build enclosure and build platform.

The 3D printer 800 may include a material cartridge receiver 816 to hold a removable material cartridge 818. The printer 800 may have more than one material cartridge receiver 816. The material cartridge receiver 816 may make material available from the material cartridge 818 as build material for the 3D printing, such as for the build platform. In some examples, the material cartridge receiver 816 may also accept build material into the material cartridge 818 from the 3D printing, such as from the build enclosure or from an internal reclaim material vessel.

The printer 800 may also include compartments 820 having internal material vessels that may receive build material from the material cartridges 818 inserted into the material cartridge receivers 816. In some examples, one internal vessel may be a new material vessel and the other internal vessel may be a recycle material vessel. In a particular example, the printer 800 may also include a compartment 822 having an internal vessel as a reclaim material vessel or a second recycle material vessel. Other configurations for the internal material vessels in the compartments 820 and 822 are applicable. Further, in certain examples, the internal material vessels may be operationally removable via user-access to the compartments 820 and 822.

Lastly, in the illustrated example, the printer 800 includes a user control panel 824 associated with a computing system of the printer 800. The control panel 824 and computing system may provide for control functions of the printer 800. Moreover, the fabrication of the 3D object in the 3D printing may be under computer control. A model and automated control may facilitate the layered manufacturing and additive fabrication. The model may be, for example, a computer aided design (CAD) model, a similar model, or other electronic data source. The computer system having a hardware processor and memory. The hardware processor may be a microprocessor, central processing unit (CPU), an ASIC or other circuitry, printer control card(s), and the like. The processor may be one or more processors, and may include one or more cores. The memory may include volatile memory such as random access memory (RAM), cache, and the like. The memory may include non-volatile memory such as a hard drive, read only memory (ROM), and so forth. The computer system may include code, e.g., instructions, logic, etc., stored in the memory and executed by the processor to direct operation of the printer 800 and to facilitate various techniques discussed herein.

Figure 9:
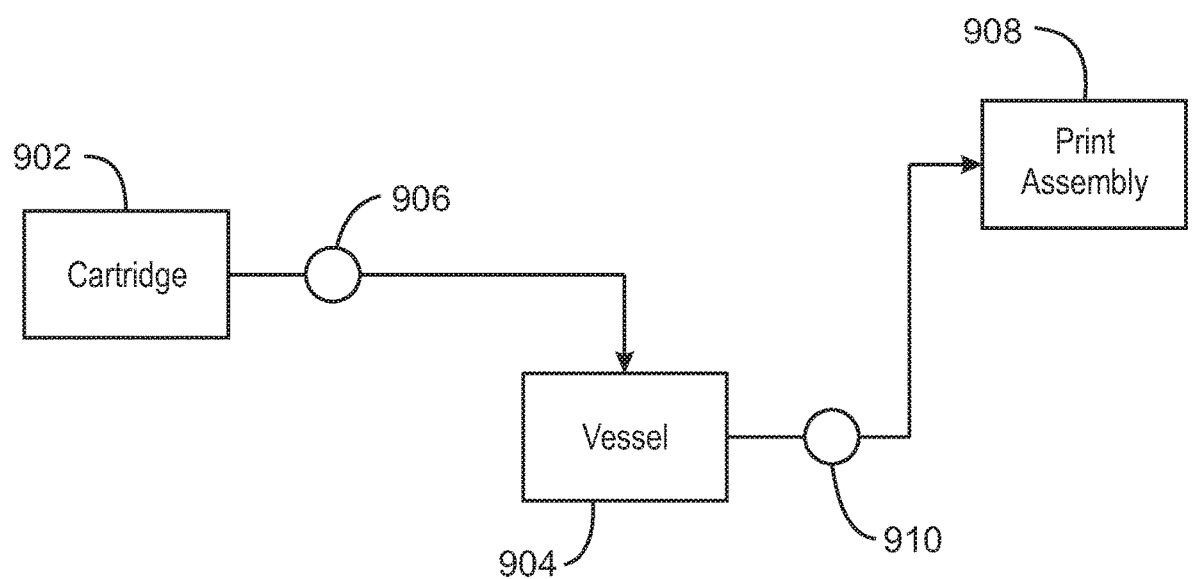
FIG. 9 is a block flow diagram of a print-liquid supply system of a 3D printer in accordance with examples of the present techniques.

FIG. 9 is a print-liquid supply system 900 integrated within a 3D printer. The supply system 900 may include a liquid cartridge receiver to hold a liquid cartridge 902. In the illustrated example, the supply system 900 includes a vessel 904 which may be a storage vessel, reservoir, and the like. The supply system 900 includes a first pump 906 to facilitate transport of print liquid from the liquid cartridge 902 to the vessel 904. The supply system 900 may provide print liquid from the vessel 904 to a print assembly 908 of the 3D printer. The supply system 900 may include a second pump 910 to facilitate transport of the print liquid from the vessel 904 to the print assembly 908.

The pumps 906 and 910 may be a positive displacement pump, diaphragm pump, gear pump, centrifugal pump, axial flow pump, and so forth. In particular examples, one or both pumps 906 and 910 are not employed but instead the print liquid supplied via gravity or other motive force. Moreover, the supply system 900 includes conduits such as tubing, piping, and channels, and also includes associated conduit fittings, valves, and so on, to facilitate transport or delivery of the print liquid via gravity or the one or more pumps 906 and 910.

Figure 10:
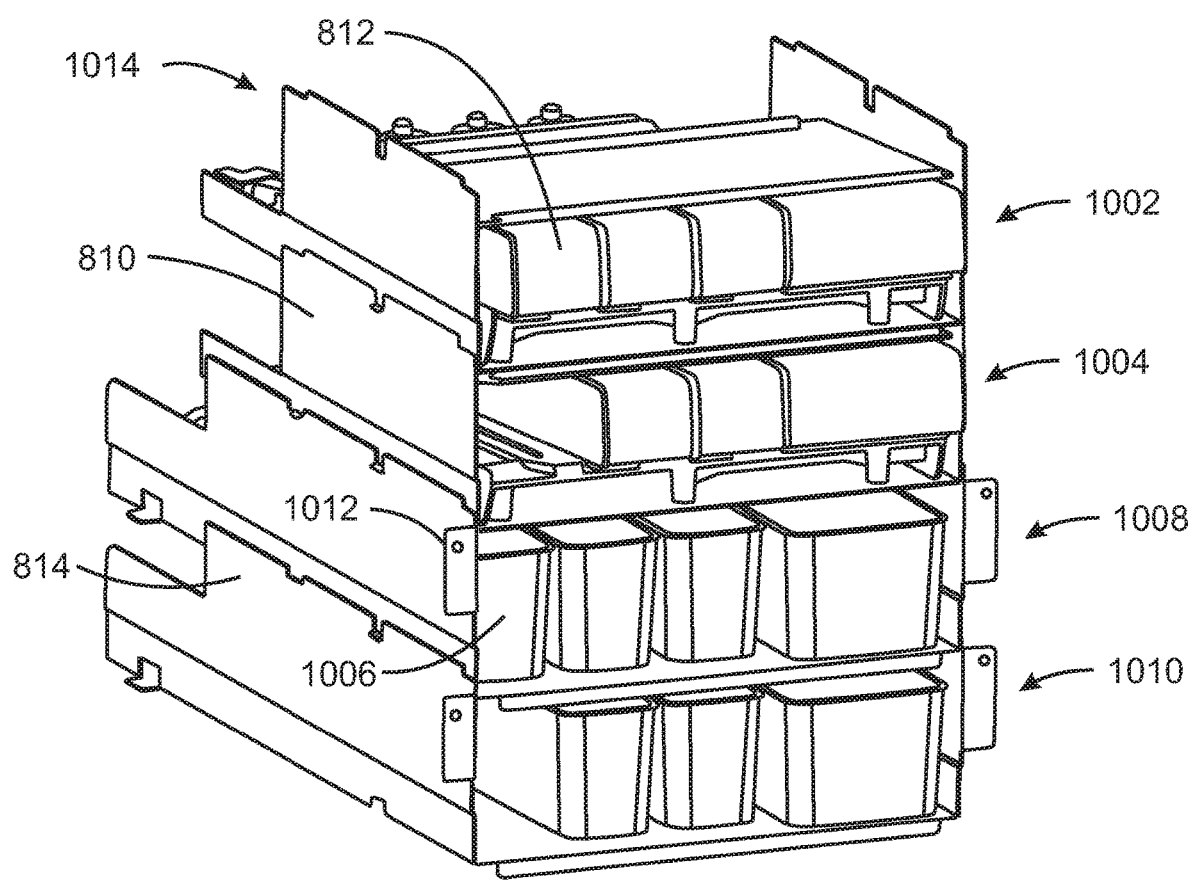
FIG. 10 is a perspective view of a print-liquid supply system of a 3D printer in accordance with examples of the present techniques.

FIG. 10 is an example of the print-liquid supply system 808 of FIG. 8. The supply system 808 has a cartridge receiver assembly 810 to hold removable print-liquid cartridges 812. The cartridge receiver assembly 808 includes multiple receiver slots for securing multiple print liquid cartridges 812. In the illustrated example, the assembly 810 includes seven receiver slots to hold seven print liquid cartridges 812, respectively. A first row 1002 has four receiver slots and associated respective print-liquid cartridges 812 inserted therein. A second row 1004 has three receiver slots and associated respective print-liquid cartridges 812 inserted therein. The cartridge receiver assembly 810 may have less than or more than seven receiver slots to hold print liquid cartridges.

The supply system 808 also include a reservoir assembly 814 having vessels 1006 or containers to receive print liquid from the print liquid cartridges 812. A vessel 1006 or container as a reservoir may correspond with a respective print liquid cartridge 812. In this example, a first row 1008 of the reservoir assembly 814 includes four vessels 1006. A second row 1010 includes three vessels 1006. In one example, each vessel 1006 may be reservoir tub with a lid sealed against the reservoir tub. The supply system 808 may include brackets 1012 or other coupling devices to install and secure the supply system 808 and its assemblies 810 and 812 into a 3D printer (see, e.g., the 3D printer 800 of FIG. 8).

Further, the supply system 808 may include pumps, other equipment, fittings, valves, vents, conduits, and so on, such as at a rear portion 1014 of the supply system 808, for delivery of print liquid. In one example, the pumps are positive displacement pumps or diaphragm pumps. The supply system 808 may include respective pumps to facilitate transport of print liquid from the liquid cartridges 812 to the associated vessels 1006. Further, the supply system 808 may include additional respective pumps to provide print liquid from the vessels 1006 to a print assembly of the 3D printer.

In one example, the supply system 808 includes a conduit manifold at the printbar of the print assembly. The manifold may distribute the print liquid to printheads or dies having print nozzles on the printbar. Different dies may receive different respective print liquid. Furthermore, in certain examples, the pumps and conduits operationally disposed between the vessels 1006 and the print assembly may recirculate the liquid between the vessels 1006 and the printbar.

Moreover, the print-liquid supply system 808 may have one or more pressure control devices to regulate inlet pressure of the print liquid for the print assembly, printbar, or printhead. In addition, the reservoir vessels 1006 may have level sensors to indicate the level or height of print liquid in the reservoir vessel 1006. The print-liquid supply system 808 may employ additional instrumentation or control devices.

The print-liquid supply system 808 may have a controller associated with the level sensors and with other devices or functions of the print-liquid supply system 808. In some examples, the controller may interface with the computer system of the 3D printer. The controller may include a processor, microprocessor, central processing unit (CPU), memory storing code executed by the processor, an integrated circuit, an application-specific integrated circuit (ASIC), a printed circuit board (PCB), a printed circuit assembly (PCA) or printed circuit board assembly (PCBA), a printer controller card, a field-programmable gate array (FPGA), or other types of circuitry. Firmware may be employed. Firmware may be code embedded on the controller such as programmed into, for example, read-only memory (ROM) or flash memory. Firmware may be instructions or logic for the controller hardware and may facilitate control, monitoring, data manipulation, and so on, by the controller. In one example, the controller is a PCA or PCBA. In addition, the print liquid cartridges 812 may have data storage devices or security chips storing data regarding original print-liquid fill amount, current print-liquid fill amount, printer family, and other data.

As indicated, the liquid-cartridge receiver assembly 810 has a liquid cartridge receiver for each print liquid cartridge 812. Likewise, in some examples, the reservoir assembly 814 has a respective vessel 1006 to receive print liquid from each print liquid cartridge 812. Thus, in examples, the supply system 808 may receive a print liquid cartridge 812 for each type of print liquid utilized by the 3D printer, and have an associated reservoir vessel 1006 for each type of print liquid utilized.

The respective vessel 1008 for each cartridge 812 (and for each print liquid type) may facilitate that the printer 800 has adequate print-liquid volumes to complete a build, e.g., to complete a print job of forming the 3D object. The vessels 1006 may perform as a reservoir for the print liquid and, therefore, provide for operation of the 3D printer when a respective print liquid cartridge 812 is depleted of print liquid. In other words, with the reservoir vessel 1008 in some examples, the 3D printing may continue when a print liquid cartridge 812 is depleted. For instance, in those examples, the 3D printing is not interrupted or paused when replacing the empty cartridge 812 with a full cartridge 812. Indeed, during that time, the reservoir vessel 1008 may provide print liquid.

Moreover, before starting of a print job, a user may insert a print liquid cartridge 812 into a cartridge receiver of cartridge receiver assembly 810, and have the 3D printer empty a cartridge 812 into the associated reservoir vessel 1006. The user may then replace the empty cartridge 812 with a full cartridge 812, and start the print job or build.

Several different print-liquid supply systems 808 are applicable. For example, the supply system 808 may have redundant print-liquid cartridges 812. The supply system 808 may have fewer or no print-liquid vessels 1008.

The supply system 808 may have more print-liquid vessels 1008 including vessels 1008 in series or "daisy-chained." For example, two vessels 1008 may be in series to supply print liquid from a print liquid cartridge 812. For instance, the first vessel in the series and which may be disposed lower than the second vessel, receives print liquid from the print liquid cartridge 812. The second vessel in the series, which may be disposed higher than the first vessel such as above the printbar on the print assembly, receives print liquid from the first vessel. In this example, the second vessel discharges print liquid to the printbar. Such a series of two or more print-liquid reservoir vessels 1008 may ease pumping implementations for supply of print liquid to the printbar.

Figure 11:
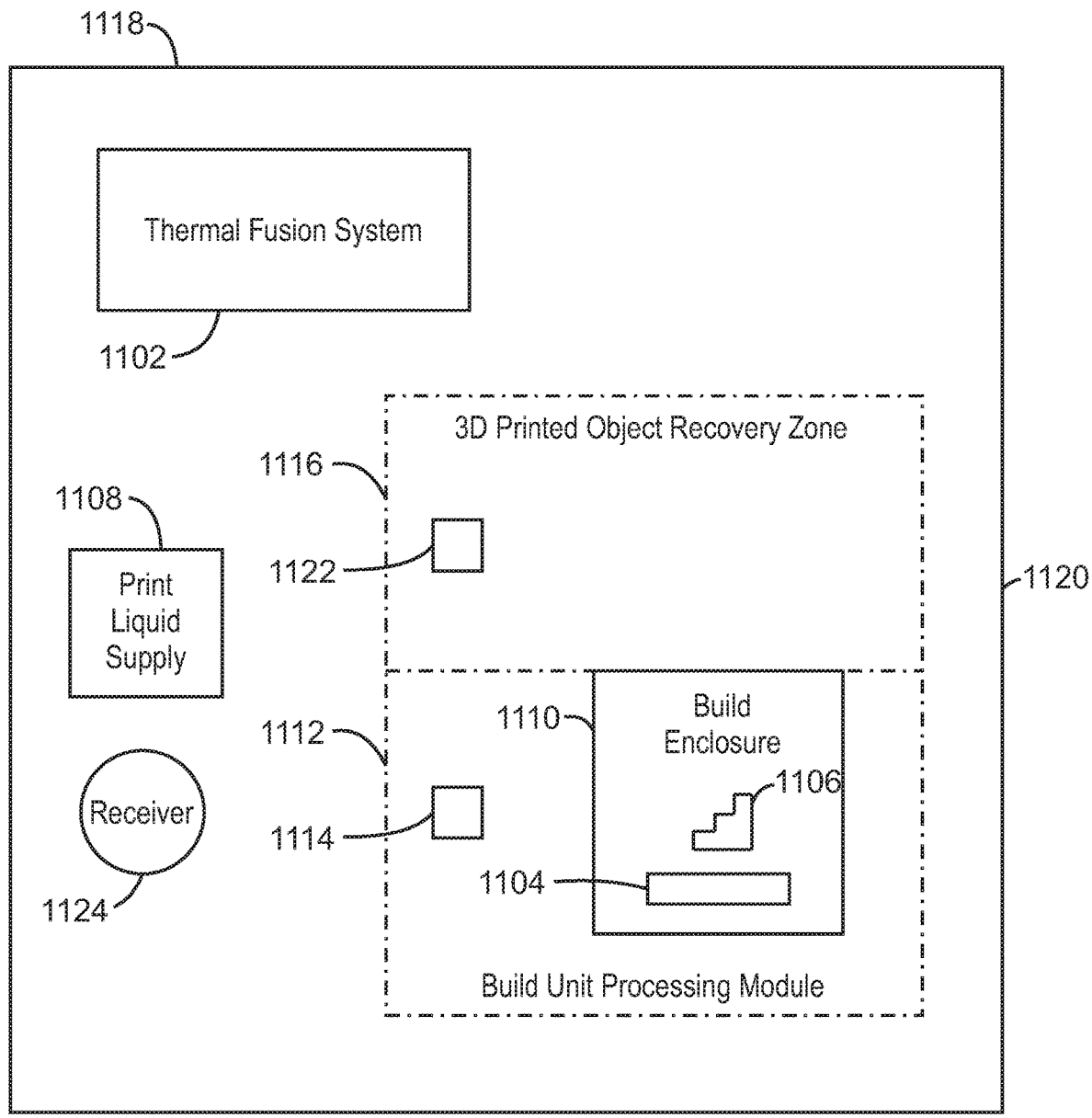
FIG. 11 is a block diagram of a 3D printer in accordance with examples of the present techniques.

FIG. 11 is a 3D printer 1100 having a thermal fusion system 1102 and a build platform 1104 to form a 3D object 1106 in 3D printing. In examples, as indicated in the discussion of the preceding figure, most or all of the thermal fusion system 1102 may be disposed above the build platform 1104. Moreover, in the present illustrated example, the printer 1100 has a print-liquid supply system 1108 to receive removable print-liquid cartridges and to provide print liquid from the print liquid cartridges to the thermal fusion system 1102.

In this example, the printer 1100 has a build enclosure 1110 associated with the build platform 1104. In certain examples, the build platform 1104 may reside on a piston (not shown), such that the printer 1100 may raise and lower the build platform 1104 within the build enclosure 1110. In some examples, the printer 1110 may raise the build platform 1104 via the piston so that the upper surface of the build platform 1104 reaches the top portion of the build enclosure 1110 or extends out of the build enclosure 1110.

In addition, the printer 1100 includes a build unit processing module 1112 which may involve or include the build platform 1104 as having holes for excess build material or unfused powder to flow through the build platform 1104. The processing module 1112 may include components 1114 to treat the 3D object 1106 and process the unfused powder. The components 1114 may be filters, sieves, separators, vibration sources, motors with an eccentric mass, and devices to provide air flow, and so forth, to process the unfused powder.

In operation, after the completion of a print job, the formed 3D object 1106 and surrounding build material may cool. The 3D object 1106 may cool at an accelerated rate when unfused powder is removed from the build enclosure 1110. Further, the formed 3D object 1106 may be treated with some of the components 1114 of the build unit processing module 1112. For instance, after the excess build material (e.g., unfused powder) is removed, the printed 3D object 1106 in the build enclosure 1110 may have partially-fused powder caked on the outside of 3D object 1106. This partially-fused powder can be removed via or with components 1114 such as a bead blaster, brush, or other tools.

The printer 1110 may have a 3D printed-object recovery zone 1116. The build platform 1104 may be manually or automatically lifted toward the recovery zone 1116. In other words, the build platform 1104 may be raised toward and to the top of the build enclosure 1110 to present the printed object 1106 on the build platform 1104 to a user or machine.

In one example, the user can access the recovery zone 1116 by lifting a lid at the top surface 1118 of a housing of the printer 1100. In another example, a door or opening on a side 1120 of the housing may provide for access to the recovery zone 1116.

The recovery zone 1116 may include components 1122 to clean the 3D object 1106 and the underlying build zone including, for example, the build enclosure 1110. The components 1122 may include tools to remove build material or powder from the printed object 1106 and to clean the build zone. The components 1122 may include containers to store the printed object 1106 and other printed 3D objects formed or to be formed by the printer 1100. The components 1122 may include other equipment such as lights to illuminate the zone 1116, and air devices or fans to provide airflow to reduce the amount of build material that might exit the printer 1100 housing during printed object recovery.

Lastly, the printer 1100 may have an integrated cartridge receiver 1124 to hold a material cartridge to supply build material for 3D printing, and to receive material from the 3D printing. The printer 1100 may have more than one cartridge receiver 1124. The printer 1100 may additionally include integrated material vessels such as hoppers or containers to receive, store, and supply build material.

Figure 12:
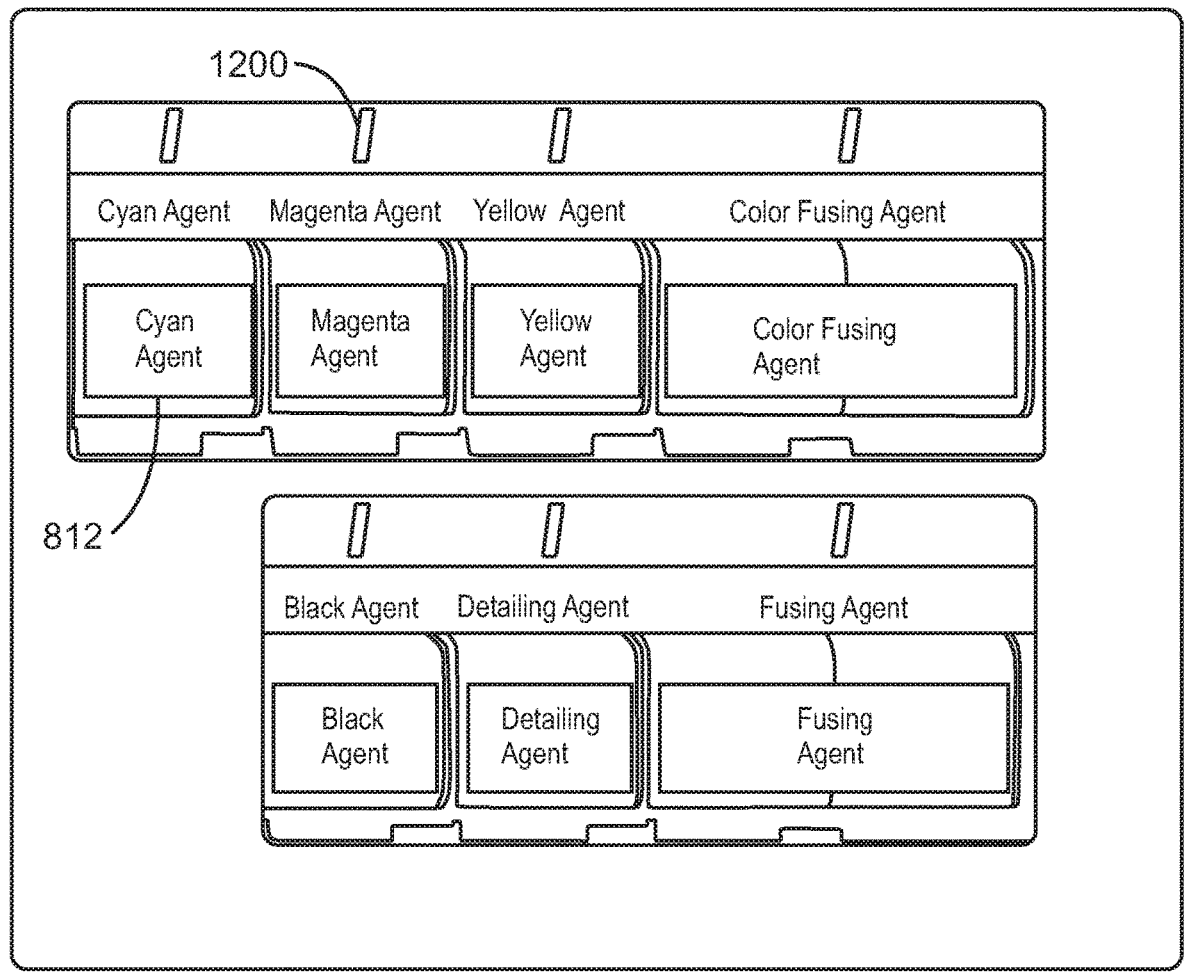
FIG. 12 is a perspective view of cartridge receiver assembly of a 3D printer having print liquid cartridges inserted therein in accordance with examples of the present techniques.

FIG. 12 is an example of a cartridge receiver assembly 810 of the print-liquid supply system 808 of the 3D printer 800 having print liquid cartridges 812 inserted therein, as depicted in FIG. 8. In the illustrated example, the cartridge receiver assembly 810 has seven slots to receive seven respective print-liquid cartridges. In this example, the 3D printer and its print assembly employ the types of print liquid denoted by the text depicted on and above the inserted print-liquid cartridges 812. However, the 3D printer and cartridge receiver assembly 810 may be configured for other types of print liquid, and with more or less than seven slots. Moreover, the 3D printer may include an indicator 1200 for one or more of the received print-liquid cartridges to indicate, for example, when a print liquid cartridge is empty or nearly empty and should be replaced. In the illustrated example, the indicator 1200 is a light emitting diode (LED). Other types of indicators 1200 are applicable.

In some examples, the print liquid may include fusing agents to promote fusing of the build material. In one example, the fusing agent is a thermal fusing agent absorbs near IR light to promote melting or fusing of the build material. The fusing agents may be tailored to absorb energy such as light to promote heating and fusing of the build material on the build platform of the 3D printer. The fusing agents may include a vehicle or carrier to hold particles that absorb light or radiation. The fusing agents may rely on reaction with the build material in addition to or in lieu of facilitating thermal fusing of the build material.

The print liquid may also include detailing agents which inhibit fusing of the build material on the build platform. Some examples of detailing agents include water. The print liquid may include coloring agents including for colors such as black, cyan, magenta, yellow, and so forth. The coloring agents may also be coloring fusing agents. The print liquid as coloring agents may be applied for cosmetic reasons and other reasons. The print liquid may include pigmented inks, specially-formulated inks, and so on. Lastly, the print liquid may also be binding agents or curing agents, and the like.

In summary, an example includes a 3D printer having a material cartridge receiver to hold a removable material cartridge to accept build material into the material cartridge from the 3D printer and to make available build material from the material cartridge. The build material may include powder including plastic, polymer, metal, glass, ceramic, or any combinations thereof. The material cartridge may be or have a container to store build material. The material cartridge receiver may include a cavity, receptacle, slot, or sleeve, or any combinations thereof. In one example, the build material accepted into the material cartridge to may include excess build material recovered from a build enclosure. The 3D printer may include a storage vessel to receive build material from the material cartridge. The 3D printer may have a conveying system, such as a pneumatic conveyance system, to facilitate transport of build material from the storage vessel to a build-material applicator, wherein the storage vessel and the pneumatic conveyance system are internal to the 3D printer. The build-material applicator may distribute build material across a build platform. Indeed, the 3D printer may have a build platform to receive build material. The 3D printer may also have the aforementioned build enclosure associated with the build platform. In some examples, the material cartridge receiver may be a recycle cartridge receiver, wherein the material cartridge is a recycle material cartridge to make available recycle material as build material. If so, the 3D printer may further include a new material cartridge receiver to hold a new material cartridge to make available new material from the new material cartridge as build material. In certain examples, the 3D printer provides build material including recycle material and new material to the build platform. In particular examples, this feed build material to the build platform may have a specified ratio based on weight or volume of new material to recycle material. In one example, the specified ratio is in a range of 0.2 to 0.8. Specified ratios outside of this range are applicable. The 3D printer may have a new material vessel to receive new material from the new material cartridge in the new cartridge receiver, and a recycle material vessel to receive recycle material from the recycle material cartridge in the recycle cartridge receiver.

The 3D printer includes a print assembly to eject print liquid onto selected portions of build material on a build platform of the 3D printer to form a 3D object from the build material. The print assembly be or include a printbar having nozzles to eject print liquid. The 3D printer includes a liquid cartridge receiver to hold a removable liquid cartridge to make available print liquid from the liquid cartridge for the print assembly. The printer includes a delivery system including a pump to provide print liquid to the print assembly. In certain examples, the delivery system supplies the print liquid from the liquid cartridge in the liquid cartridge receiver to the print assembly. The pump may be a positive displacement pump or other type of pump. The delivery system may include a reservoir vessel for print liquid. The print liquid may include a thermal fusing agent, a fusing agent, a curing agent, a binding agent, a detailing agent, a coloring agent, or any combinations thereof. The 3D printer may include an energy source to apply energy to the build material on the build platform and, therefore, apply energy to the print liquid ejected onto the selected portions of the build material to form the 3D object. The 3D printer may fuse successive layers of the selected portions of build material on the build platform to form the 3D object. Lastly, the liquid cartridge receiver may be a first liquid cartridge receiver to make available print liquid including a first print liquid from the liquid cartridge. If so, the 3D printer may further include a second liquid cartridge receiver to hold a removable second liquid cartridge to make available print liquid including a second print liquid from the second liquid cartridge, the second print liquid different than the first print liquid.

Another example includes a 3D printer having a build-material applicator to distribute build material across a build platform of the 3D printer. The 3D printer has a material cartridge receiver to hold a removable material cartridge to accept build material into the removable material cartridge from the 3D printer and to make available build material from the removable material cartridge for the build-material applicator and the build platform. The printer may have more than one material cartridge receiver. Moreover, the build material provided to the build-material applicator and build platform may include new material and recycle material. Further, the 3D printer includes a thermal fusion system to eject print liquid onto build material on the build platform to form a 3D object from the build material on the build platform. In some examples, the print liquid may include a fusing agent, a detailing agent, a coloring agent, a coloring fusing agent, or any combinations thereof. In certain examples, the thermal fusion system includes a printbar to eject the print fluid. The thermal fusion system may also include an energy source that applies energy to the build material and, thus, applies energy to the print fluid ejected onto the build material to form the 3D object on the build platform. In examples, the thermal fusion system selectively fuses portions of successive layers of build material on the build platform to form the 3D object.

The 3D printer has a print-liquid cartridge receiver to hold a removable print-liquid cartridge to make available print liquid from the print-liquid cartridge for the thermal fusion system. In one implementation, the 3D printer may have a second print-liquid cartridge receiver to hold a removable second print-liquid cartridge to make available print liquid including a second print liquid from the second print-liquid cartridge for the thermal fusion system, wherein the first print liquid in this example implementation includes a fusing agent to promote fusing and the second print liquid includes a detailing agent to inhibit fusing. Furthermore, the 3D printer has a print-liquid delivery system including a pump and a reservoir vessel to transport print liquid to the thermal fusion system. In one example, the reservoir vessel has a sensor to indicate level of print liquid in the reservoir vessel. In particular examples, the pump is a positive displacement pump such as a diaphragm pump or gear pump, or other type of positive displacement pump. In other examples, the pump may be a centrifugal pump or axial flow pump, and the like. In yet other examples, the print-liquid delivery system does not employ a pump but instead relies on gravity or other motive force for transport of the print liquid from the liquid cartridge to the print assembly. Also, the print-liquid supply system may not employ a reservoir vessel but may accommodate, for example, redundant print-liquid cartridges for the same type of print liquid. In other examples, the reservoir vessel may be two reservoir vessels in series to provide print liquid from a liquid cartridge in the liquid cartridge receiver to the print assembly.

While the present techniques may be susceptible to various modifications and alternative forms, the examples discussed above have been shown by way of example. It is to be understood that the technique is not intended to be limited to the particular examples disclosed herein. Indeed, the present techniques include all alternatives, modifications, and equivalents falling within the scope of the present techniques.

What is claimed is:

1. A three-dimensional (3D) printer comprising:
a build platform to receive a build material;
a build enclosure associated with the build platform;
a print assembly to eject print liquid onto selected portions of the build material on the build platform to form a 3D object;
a first liquid cartridge receiver to hold a removable first liquid cartridge to make available a first print liquid from the removable first liquid cartridge for the print assembly;
a delivery system to provide the first print liquid to the print assembly;
a recycle vessel and a reclaim vessel, wherein the recycle vessel and the reclaim vessel are fluidly coupled to the build enclosure such that the build material is flowed along a first flow path to the recycle vessel and along a second flow path to the reclaim vessel, and
a conveyance system fluidly coupled to the recycle vessel and the reclaim vessel, wherein the conveyance system is to provide the build material to the build enclosure from the recycle vessel and the reclaim vessel.

2. The 3D printer of claim 1, comprising an energy source to apply energy to the build material on the build platform and to the first print liquid ejected onto the selected portions of the build material to form the 3D object, wherein the print assembly comprises a printbar having nozzles to eject the first print liquid, and wherein the delivery system comprises a pump.

3. The 3D printer of claim 2, wherein the pump comprises a positive displacement pump, wherein the delivery system comprise a reservoir vessel for the first print liquid, wherein the delivery system is to supply the first print liquid from the removable first liquid cartridge in the first liquid cartridge receiver to the print assembly, and wherein the 3D printer is to fuse successive layers of the selected portions of the build material on the build platform to form the 3D object.

4. The 3D printer of claim 1, wherein the first print liquid comprises a thermal fusing agent, a fusing agent, a coloring fusing agent, a curing agent, a binding agent, a detailing agent, a coloring agent, or any combinations thereof, wherein the 3D printer further comprises a second liquid cartridge receiver to hold a removable second liquid cartridge to make available a second print liquid from the removable second liquid cartridge, and wherein the second print liquid is different than the first print liquid.

5. The 3D printer of claim 1, wherein the conveyance system comprises a pneumatic conveyance system, wherein the recycle vessel, the reclaim vessel, and the pneumatic conveyance system are internal to the 3D printer, and wherein the build material comprises powder comprising plastic, polymer, metal, glass, ceramic, or any combinations thereof.

6. The 3D printer of claim 1, wherein the build material flowed along the first flow path and the second flow path comprises excess build material recovered from the build enclosure.

7. The 3D printer of claim 1, wherein the 3D printer further comprises a build material cartridge receiver to hold a build material cartridge to make available the build material from the build material cartridge, and wherein the 3D printer is to provide the build material from the recycle vessel, the reclaim vessel, and the build material cartridge to the build platform.

8. The 3D printer of claim 7, wherein the 3D printer is to provide the build material to the build platform from the build material cartridge at a rate of 0.2 to 0.8 times a rate of the build material that is provided to the build platform from the recycle vessel and the reclaim vessel, with respect to weight or volume of the build material.

9. A method of operating the three-dimensional (3D) printer of claim 1, comprising:
- transporting to a power spreader, via the conveyance system, recycle material made available from a recycle material cartridge via the recycle vessel, and receiving into the recycle material cartridge excess build material recovered from the build enclosure;
- placing, via the powder spreader, the build material on the build platform, the build material comprising new material and the recycle material;
- providing, via the delivery system, the first print liquid from the first liquid cartridge to the print assembly, wherein the print assembly comprises a print bar and the delivery system comprises a pump; and
- ejecting, via the printbar, the first print liquid onto the build material on the build platform.

10. The method of claim 9, comprising:
- applying energy to the build material on the build platform; and
- applying energy to the first print liquid ejected onto the build material, wherein ejecting the first print liquid comprises ejecting, via the printbar under computer control, the first print liquid onto selected portions of the build material on the build platform, wherein the pump comprises a positive displacement pump, and wherein the first print liquid comprises a fusing agent, a curing agent, a binding agent, a detailing agent, a coloring agent, or any combinations thereof.

11. The method of claim 9, comprising transporting, via the conveyance system, new material made available from a new material cartridge in the 3D printer to the powder spreader, wherein transporting the recycle material and the new material comprises providing the build material to the build platform with a specified ratio of new material to recycle material, and wherein the conveyance system comprises a pneumatic conveyance system.

12. The method of claim 11, wherein transporting the recycle material comprises receiving the recycle material into the recycle vessel from the recycle material cartridge, and wherein transporting the new material comprises receiving the new material into a new material vessel from the new material cartridge.

* * * * *